(12) United States Patent
Melone et al.

(10) Patent No.: US 11,981,196 B2
(45) Date of Patent: *May 14, 2024

(54) ZERO-TURN RADIUS LAWNMOWER WITH SUSPENSION SYSTEM

(71) Applicant: Briggs & Stratton, LLC, Wauwatosa, WI (US)

(72) Inventors: Mark J. Melone, Rome, NY (US); James F. Marshall, Munnsville, NY (US); Richard Smith, Morrisville, NY (US); Mark Lynch, Munnsville, NY (US); Travis Rasch, Hustisford, WI (US); Erik Slegelis, Port Washington, WI (US); Steven J. Weber, Germantown, WI (US); Denis Oswald, Hartford, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 713 days.

This patent is subject to a terminal disclaimer.

(21) Appl. No.: 17/139,424

(22) Filed: Dec. 31, 2020

(65) Prior Publication Data

US 2021/0122237 A1    Apr. 29, 2021

Related U.S. Application Data

(63) Continuation of application No. 16/132,577, filed on Sep. 17, 2018, now Pat. No. 10,882,397, which is a
(Continued)

(51) Int. Cl.
*B60K 17/10*    (2006.01)
*A01D 34/64*   (2006.01)
*B60G 9/00*    (2006.01)

(52) U.S. Cl.
CPC ............ *B60K 17/105* (2013.01); *A01D 34/64* (2013.01); *B60G 9/003* (2013.01);
(Continued)

(58) Field of Classification Search
CPC .. B60K 17/105; B60G 9/003; B60G 2204/18; B60G 2300/084; B60Y 2200/223
See application file for complete search history.

(56) References Cited

U.S. PATENT DOCUMENTS 2,756,045 A    7/1956  Savory
3,311,186 A    3/1967  Kamlukin
(Continued)

FOREIGN PATENT DOCUMENTS

DE    38 04 423    8/1988
JP    2004-055918   2/2004

OTHER PUBLICATIONS

U.S. Appl. No. 15/082,765, filed Mar. 28, 2016.
(Continued)

*Primary Examiner* — Paul N Dickson
*Assistant Examiner* — Tiffany L Webb
(74) *Attorney, Agent, or Firm* — Foley & Lardner LLP

(57) ABSTRACT

Ride-on equipment includes a pair of front wheels, a pair of rear wheels, a main frame, a subframe pivotally coupled to the main frame about a pivot axis, a power source, and a transaxle assembly. The power source is coupled to and supported by the main frame and includes a drive pulley. The transaxle assembly is configured to pivot with respect to the power source, is operably coupled to the pair of rear drive wheels, and includes at least one driven pulley. The drive pulley and the at least one driven pulley are operably coupled by a belt such that the at least one driven pulley of the transaxle assembly is configured to be driven by the drive pulley of the source via the belt.

20 Claims, 25 Drawing Sheets

Related U.S. Application Data continuation of application No. 15/652,905, filed on Jul. 18, 2017, now Pat. No. 10,093,178, which is a continuation of application No. 15/226,811, filed on Aug. 2, 2016, now Pat. No. 9,849,776, which is a continuation of application No. 15/082,765, filed on Mar. 28, 2016, now abandoned, which is a continuation of application No. 13/840,070, filed on Mar. 15, 2013, now Pat. No. 9,161,490.

(60) Provisional application No. 61/677,288, filed on Jul. 30, 2012, provisional application No. 61/643,809, filed on May 7, 2012.

(52) U.S. Cl.
CPC ...... *B60G 2204/18* (2013.01); *B60G 2204/19* (2013.01); *B60G 2300/084* (2013.01); *B60Y 2200/223* (2013.01)

(56) References Cited

U.S. PATENT DOCUMENTS

| | | |
|---|---|---|
| 3,719,371 A | 3/1973 | Musgrave |
| 3,796,275 A | 3/1974 | Bouyer |
| 3,876,226 A | 4/1975 | Cutler |
| 3,940,161 A | 2/1976 | Allison |
| 3,954,255 A | 5/1976 | Keijzer et al. |
| 4,037,389 A | 7/1977 | Harkness |
| 4,042,053 A | 8/1977 | Sieren et al. |
| 4,102,114 A | 7/1978 | Estes et al. |
| 4,132,121 A | 1/1979 | Clarke |
| 4,231,215 A | 11/1980 | Klas |
| 4,256,292 A | 3/1981 | Sullivan et al. |
| 4,367,864 A | 1/1983 | Eldeen |
| 4,449,602 A | 5/1984 | Dittmann, Jr. |
| 4,553,381 A | 11/1985 | Sonnenberg |
| 4,577,712 A | 3/1986 | Foote et al. |
| 4,592,439 A | 6/1986 | Collard et al. |
| 4,600,072 A | 7/1986 | Krude |
| 4,726,256 A * | 2/1988 | von Kaler ............... F16H 3/72 475/900 |
| 4,809,796 A | 3/1989 | Yamaoka et al. |
| 4,860,850 A | 8/1989 | Takahashi |
| 4,969,533 A | 11/1990 | Holm et al. |
| 5,012,632 A | 5/1991 | Kuhn et al. |
| 5,042,238 A | 8/1991 | White et al. |
| 5,067,933 A | 11/1991 | Hardesty et al. |
| 5,090,512 A | 2/1992 | Mullet et al. |
| 5,343,974 A | 9/1994 | Rabek |
| 5,353,580 A | 10/1994 | Wolff |
| 5,367,861 A | 11/1994 | Murakawa et al. |
| 5,367,864 A | 11/1994 | Ogasawara et al. |
| 5,381,647 A | 1/1995 | Eberle |
| 5,433,066 A | 7/1995 | Wenzel et al. |
| 5,483,787 A | 1/1996 | Berrios |
| 5,487,535 A | 1/1996 | Carter et al. |
| 5,706,907 A | 1/1998 | Unruh |
| 5,799,475 A | 9/1998 | Borling et al. |
| 5,873,224 A | 2/1999 | Murakawa et al. |
| 5,946,893 A | 9/1999 | Gordon |
| 5,996,982 A | 12/1999 | Bell |
| 6,062,333 A | 5/2000 | Gordon |
| 6,098,740 A | 8/2000 | Abend et al. |
| 6,101,794 A | 8/2000 | Christopherson et al. |
| 6,170,242 B1 | 1/2001 | Gordon |
| 6,178,668 B1 | 1/2001 | Gustafson et al. |
| 6,244,025 B1 | 6/2001 | Ferris et al. |
| 6,425,452 B1 | 7/2002 | Steiner et al. |
| 6,460,318 B1 | 10/2002 | Ferris et al. |
| 6,501,678 B1 | 12/2002 | Lenssen et al. |
| 6,510,678 B2 | 1/2003 | Ferris et al. |
| 6,711,885 B2 | 3/2004 | Ferris |
| 6,830,115 B2 | 12/2004 | Okada et al. |
| 6,857,254 B2 | 2/2005 | Melone et al. |
| 6,874,593 B2 | 4/2005 | Abend et al. |
| 6,902,017 B2 | 6/2005 | Ohashi |
| 6,904,985 B2 | 6/2005 | Ferree et al. |
| 6,990,309 B2 | 1/2006 | Kayahara et al. |
| 6,990,609 B2 | 1/2006 | Wiley et al. |
| 7,078,292 B2 | 7/2006 | Park et al. |
| 7,082,759 B1 | 8/2006 | Tsukamoto et al. |
| 7,107,746 B2 | 9/2006 | Melone et al. |
| 7,373,871 B1 | 5/2008 | Buescher |
| 7,374,187 B2 | 5/2008 | Melone et al. |
| 7,427,247 B2 | 9/2008 | Melone |
| 7,475,894 B2 | 1/2009 | Hodge |
| 7,494,142 B2 | 2/2009 | Wolter |
| 7,503,161 B1 | 3/2009 | Mizukawa et al. |
| 7,600,769 B2 | 10/2009 | Bessho et al. |
| 7,694,769 B2 | 4/2010 | McGuire |
| 7,708,106 B1 | 5/2010 | Bergman et al. |
| 7,775,314 B2 | 8/2010 | Blais et al. |
| 7,793,745 B2 | 9/2010 | Witt et al. |
| 7,896,123 B2 | 3/2011 | Ohashi et al. |
| 7,900,943 B2 | 3/2011 | Stewart |
| 7,930,813 B2 | 4/2011 | Melone et al. |
| 7,934,579 B2 | 5/2011 | Bowers |
| 8,322,736 B2 | 12/2012 | Bowers |
| 8,397,367 B2 | 3/2013 | Melone et al. |
| 8,398,101 B2 | 3/2013 | Alexander et al. |
| 8,517,140 B2 | 8/2013 | West et al. |
| 9,161,490 B2 | 10/2015 | Melone et al. |
| 9,481,242 B2 | 11/2016 | Melone et al. |
| 9,499,204 B1 | 11/2016 | Gust et al. |
| 9,597,957 B2 | 3/2017 | Weber et al. |
| 9,707,842 B2 | 7/2017 | Melone et al. |
| 9,849,776 B2 | 12/2017 | Melone et al. |
| 10,005,358 B2 * | 6/2018 | Schmidt ............... B60K 17/08 |
| 10,005,437 B2 | 6/2018 | Slegelis et al. |
| 10,093,178 B2 | 10/2018 | Melone et al. |
| 10,093,179 B2 | 10/2018 | Melone et al. |
| 10,414,273 B1 * | 9/2019 | Hauser .................. A01D 34/64 |
| 10,421,356 B2 | 9/2019 | Weber et al. |
| 10,464,537 B2 | 11/2019 | Slegelis et al. |
| 10,882,397 B2 | 1/2021 | Melone et al. |
| 11,267,443 B2 | 3/2022 | Slegelis et al. |
| 11,427,048 B1 * | 8/2022 | Long ..................... B60G 7/006 |
| 11,603,078 B2 | 3/2023 | Slegelis et al. |
| 2002/0043422 A1 | 4/2002 | Suzuki |
| 2002/0083694 A1 | 7/2002 | Nagai et al. |
| 2002/0179341 A1 | 12/2002 | Boyer et al. |
| 2003/0000191 A1 | 1/2003 | Haverstein et al. |
| 2003/0127266 A1 | 7/2003 | Kirkpatrick |
| 2003/0179341 A1 | 9/2003 | Choo |
| 2003/0213625 A1 | 11/2003 | Okada et al. |
| 2004/0079063 A1 | 4/2004 | Ishimori |
| 2004/0182057 A1 | 9/2004 | Price |
| 2005/0144923 A1 | 7/2005 | Melone et al. |
| 2007/0209457 A1 | 9/2007 | Irikura et al. |
| 2007/0283675 A1 | 12/2007 | Hancock et al. |
| 2008/0302075 A1 | 12/2008 | Eavenson, Sr. |
| 2009/0127813 A1 | 5/2009 | Stewart |
| 2009/0218781 A1 | 9/2009 | Sellars et al. |
| 2009/0241702 A1 | 10/2009 | Osuga et al. |
| 2011/0197419 A1 | 8/2011 | Melone et al. |
| 2012/0248726 A1 | 10/2012 | Batdorf et al. |
| 2013/0047567 A1 | 2/2013 | Minoura et al. |
| 2013/0291508 A1 | 11/2013 | Melone et al. |
| 2015/0040531 A1 | 2/2015 | Melone et al. |
| 2015/0078871 A1 | 3/2015 | Eavenson et al. |
| 2017/0028844 A1 | 2/2017 | Melone et al. |
| 2018/0077859 A1 | 3/2018 | Sutton et al. |
| 2019/0184822 A1 | 6/2019 | Vigen et al. |
| 2020/0156467 A1 | 5/2020 | Weber et al. |
| 2020/0180573 A1 | 6/2020 | Slegelis et al. |
| 2021/0122237 A1 | 4/2021 | Melone et al. |

OTHER PUBLICATIONS

Complaint filed on Mar. 20, 2013 in *Briggs & Stratton Corporation, Briggs & Stratton Power Products Group, LLC v. Chongqing RATO Power Co., Ltd; RATO North America; Denver Global Products,*

(56) References Cited

OTHER PUBLICATIONS

*Inc.*, 5:13-CV-0316 {TJM/ATB), United States District Court, Northern District of New York.

Declaration of Clark J. Radcliffe in Support of Defendants' Motions for Summary Judgment filed on Jan. 7, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 95 pages.

Declaration of Jeffrey M. Olson in Support of Defendants' Motions for Summary Judgment of Invalidity filed on Jan. 7, 2014 in *Briggs & Stratton Corporation, Briggs & Stratton Power Products Group, LLC v. Chongqing RATO Power Ltd; RATO North America; Denver Global Products, Inc.*, 5:13-CV-0316 (LEK/ATB), United States District Court, Northern District of New York, 306 pages.

Declaration of Jeffrey M. Olson in Support of Defendants' Opening Claim Construction Brief and Motion for Summary Judgment of Indefiniteness filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-SV-0316 {LEK/ATB), United States District Court, Northern District of New York, 212 pages.

Defendants' [Proposed] Amended L. Pal. R. 3.3-3.4 Disclosure of Non-Infringement and Invalidity Contentions mailed on Nov. 1, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 86 pages.

Defendants' Amended L. Pal. R. 3.3-3.4 Disclosure of Non-Infringement and Invalidity Contentions mailed on Dec. 16, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 87 pages.

Defendants' Corrected Answer to Complaint and Defendant Denver Global Products, Inc.'s Counterclaims and Demand for Jury Trial filed on Jun. 12, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 LEK/ATB), United States District Court, Northern District of New York, 15 pages.

Defendants' L. Pal. R. 3.3-3.4 Disclosure of Non-Infringement and Invalidity Contentions mailed on Oct. 21, 2013 n *Briggs & Stratton Corporation, Briggs & Stratton Power Products Group, LLC v. Chongqing RATO Power Co., Ltd.; RATO North America; Denver Global Products, Inc.*, 5:13-CV-0316 (LEK/ATB), United States District Court, Northern District of New York, 78 pages.

Defendants' Opening Claim Construction Brief filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 30 pages.

Defendants' Preliminary Proposed Constructions and Preliminary Identification of Intrinsic and Extrinsic Evidence mailed on Nov. 27, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 40 pages.

Defendants' Responsive Claim Construction Brief filed on Mar. 3, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 29 pages.

Expert Declaration of Clark J. Radcliffe regarding Claim Term Definitions for Construction filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 38 pages.

Expert Declaration of Timothy M. Hicks in Response to Defendants' Expert Declaration by Clark J. Radcliffe, PhD mailed on Dec. 23, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 9 pages.

Expert Declaration of Timothy M. Hicks Regarding U.S. Pat. No. 7,107,746 filed on Feb. 18, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 3 pages.

Information about Related Patents and Patent Applications, see section 6 of the accompanying Information Disclosure Statement Letter, which concerns Related Patents and Patent Applications.

Joint Statement Pursuant to Local Patent Rule 4.7 filed on Mar. 17, 2014 in *Briggs & Stratton Corporation, Briggs & Stratton Power Products Group, LLC v. Chongqing RATO Power Co., Ltd.; RATO North America; Denver Global Products, Inc.*, 5:13-CV-0316 (LEK/ATB), United States District Court, Northern District of New York, 5 pages.

Letter Brief to Court regarding significant recent authority relating to Denver Global Products, Inc.'s pending Motion for Summary Judgement of Invalidity for Indefiniteness filed on Jun. 3, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 20 pages.

Letter Brief to Court regarding significant recent authority relating to the parties' claim construction briefing and Denver Global Products, Inc.'s pending Motion for Summary Judgement of Invalidity for Indefiniteness filed on Sep. 15, 2014 in *Briggs & Stratton Corporation, Briggs & Stratton Power Products Group, LLC v. Chongqing RATO Power Co., ld; RATO North America; Denver Global Products, Inc.*, 5:13-CV-0316 (LEK/ATB), United States District Court, Northem District of New York, 17 pages.

Letter to Court addressing statements in Brigg's letter request filed on Feb. 21, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 2 pages.

Memorandum of Law in Support of Defendants' Motion for Summary Judgment of Invalidity of U.S. Pat. No. 5,510,678 filed on Jan. 7, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 27 pages.

Memorandum of Law in Support of Defendants' Motion for Summary Judgment of Invalidity of U.S. Pat. No. 7,107,746 filed on Jan. 7, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 19 pages.

Memorandum of Law in Support of Defendants' Notice of Motion for Summary Judgment of Invalidity for Indefiniteness filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 10 pages.

Memorandum-Decision and Order filed on Jul. 30, 2015 n *Briggs & Stratton Corporation, Briggs & Stratton Power Products Group,*

(56) References Cited

OTHER PUBLICATIONS

LLC v. *Chongqing RATO Power Co., Ltd; RATO North America; Denver Global Products, Inc.*, 5:13-3V-0316 (LEK/ATB), United States District Court, Northern District of New York, 18 pages.

Memorandum-Decision and Order filed on Sep. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 40 pages.

Plaintiffs' Disclosure of Asserted Claims and Infringement Contentions Pursuant to Local Patent Rules 3.1 and 3.2 mailed on Sep. 19, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 28 pages.

Plaintiffs' Opening Claim Construction Brief filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 32 pages.

Plaintiffs' Opposition to Defendants' Motion for Summary Judgement of Invalidity for Indefiniteness filed on Feb. 18, 2014 in *Briggs & Stratton Corporation, Briggs & Stratton Power Products Group, LLC v. Chongqing RATO Power So., Ltd; RATO North America; Denver Global Products, Inc.*, 5:13-CV-0316 {LEK/ATB), United States District Court, Northern District of New York, 33 pages.

Plaintiffs' Opposition to Defendants' Motion for Summary Judgment of Invalidity of U.S. Pat. No. 6,510,678 filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 31 pages.

Plaintiffs' Opposition to Defendants' Motion for Summary Judgment of Invalidity of U.S. Pat. No. 7,107,746 filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 32 pages.

Plaintiffs' Proposed Constructions and Identification of Intrinsic and Extrinsic Evidence mailed on Nov. 27, 2013 n *Briggs & Stratton Corporation, Briggs & Stratton Power Products Group, LLC v. Chongqing RATO Power Co., Ltd.; RATO North America; Denver Global Products, Inc.*, 5:13-CV-0316 (LEK/ATB), United States District Court, Northern District of New York, 78 pages.

Plaintiffs' Rebuttal Claim Construction Brief filed on Mar. 3, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 33 pages.

Plaintiffs' Responses and Objections to Rata's First Set of Interrogatories [Nos. 1-10] mailed Oct. 9, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 61 pages.

Plaintiffs' Responses and Objections to Rata's Second Set of Interrogatories [No. 11] mailed on Jan. 15, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 6 pages.

Plaintiffs-Counterdefendants' Answer to Corrected Counterclaims filed on Jul. 5, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 9 pages.

Replacement Exhibit 11 to Olson Declaration filed on Jan. 8, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 3 pages.

Reply Brief in Support of Defendants' Motion for Summary Judgment of Invalidity for Indefiniteness filed on Feb. J4, 2014 in *Briggs & Stratton Corporation, Briggs & Stratton Power Products Group, LLC v. Chongqing RATO Power So., Ltd.; RATO North America; Denver Global Products, Inc.*, 5:13-CV-0316 (LEK/ATB), United States District Court, Northern District of New York, 15 pages.

Reply Brief in Support of Defendants Motion for Summary Judgment of Invalidity of U.S. Pat. No. 6,510,678 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 14 pages.

Reply Brief in Support of Defendants' Motion for Summary Judgment of Invalidity of U.S. Pat. No. 7,107,746 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 14 pages.

Supplemental Declaration of Jeffrey M. Olson in Support of Defendants' Motion for Summary Judgment of Invalidity filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 6 pages.

The Parties' Joint Claim Construction Statement Pursuant to Local Patent Rule 4.4 filed on Dec. 16, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 9 pages.

U.S. Appl. No. 61/643,809, filed May 7, 2012, Slegelis et al.
U.S. Appl. No. 61/677,288, filed Jul. 30, 2012, Melone et al.
U.S. Appl. No. 62/131,738, filed Mar. 11, 2015, Slegelis et al.

* cited by examiner

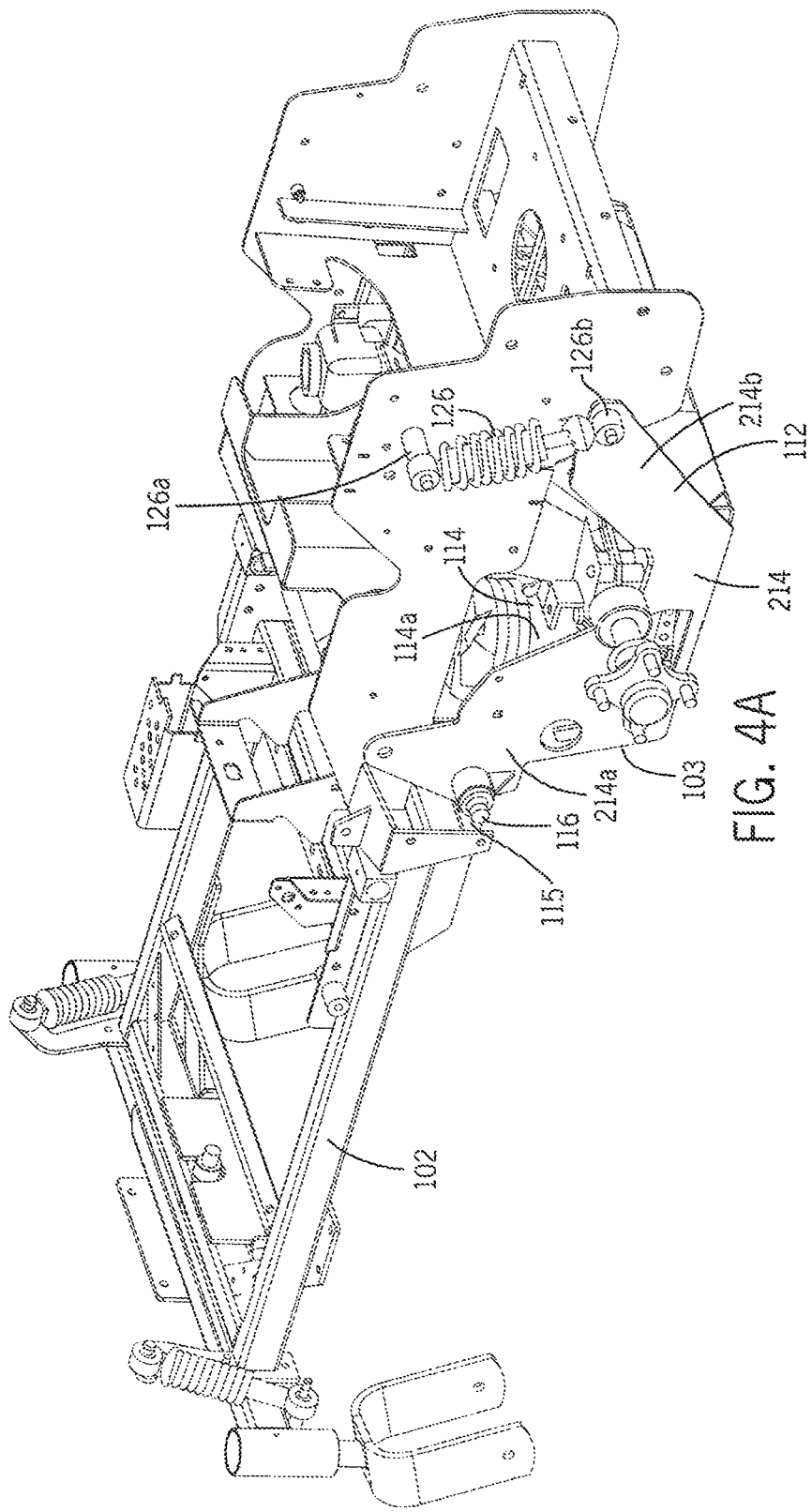

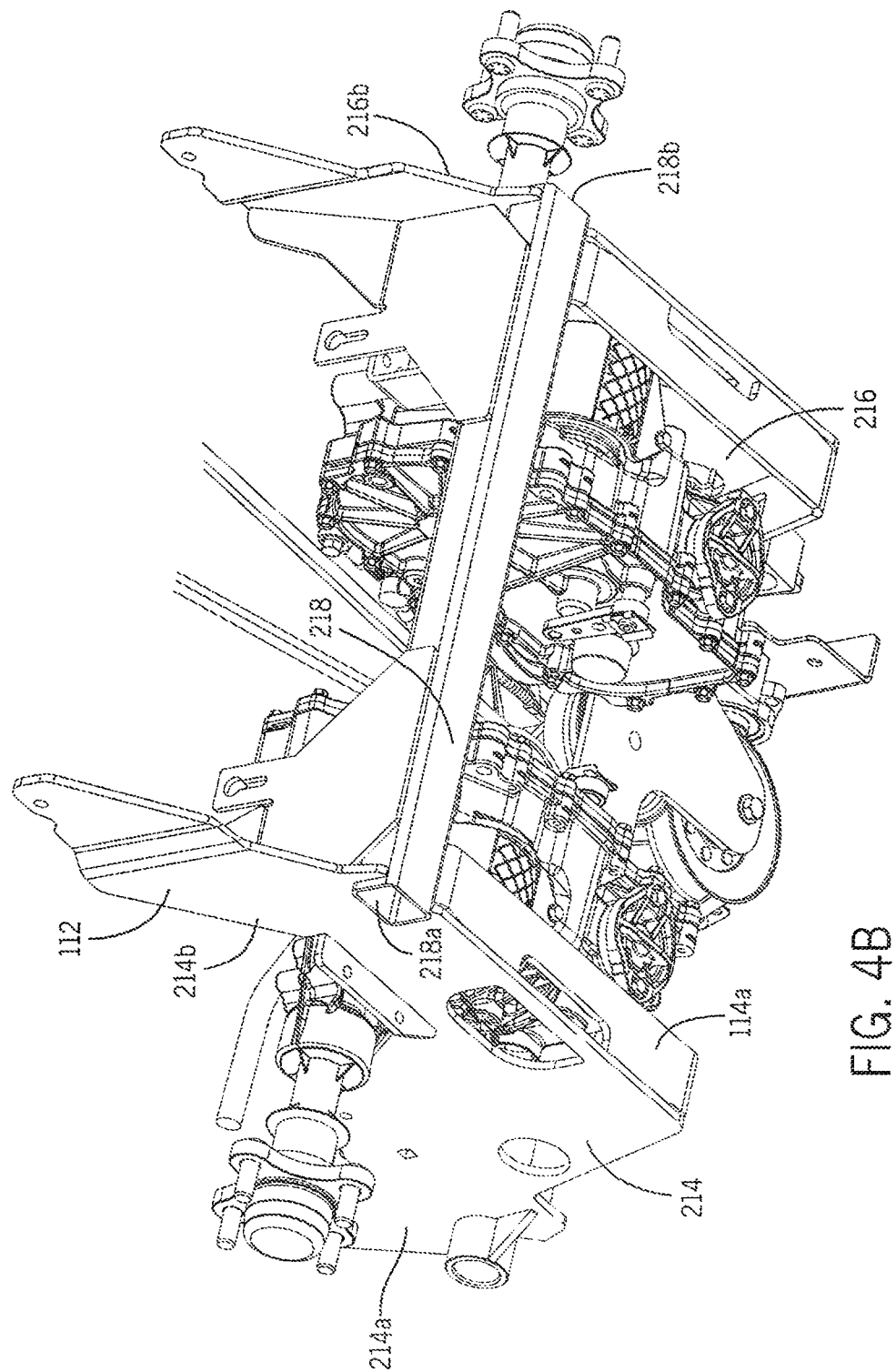

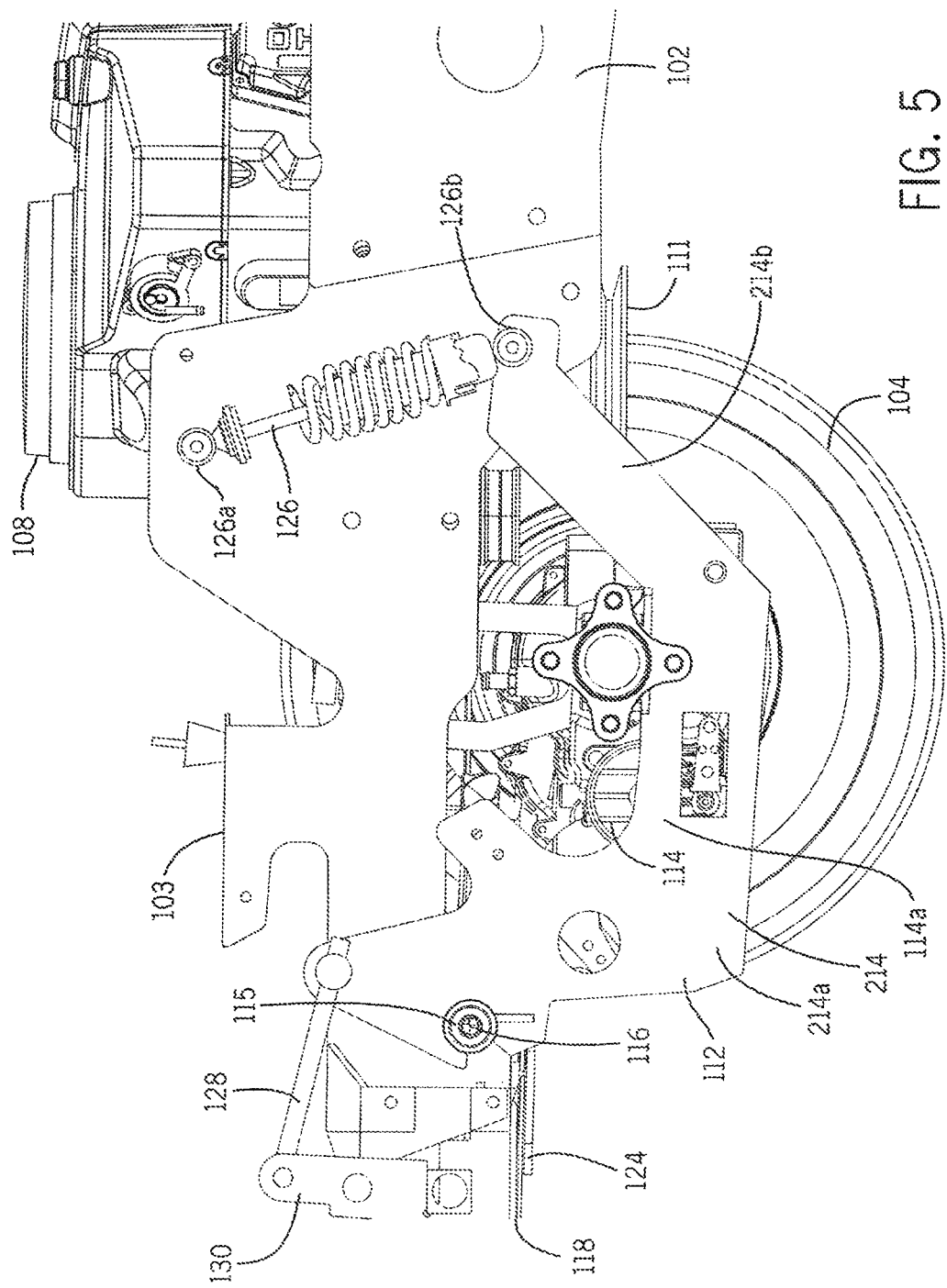

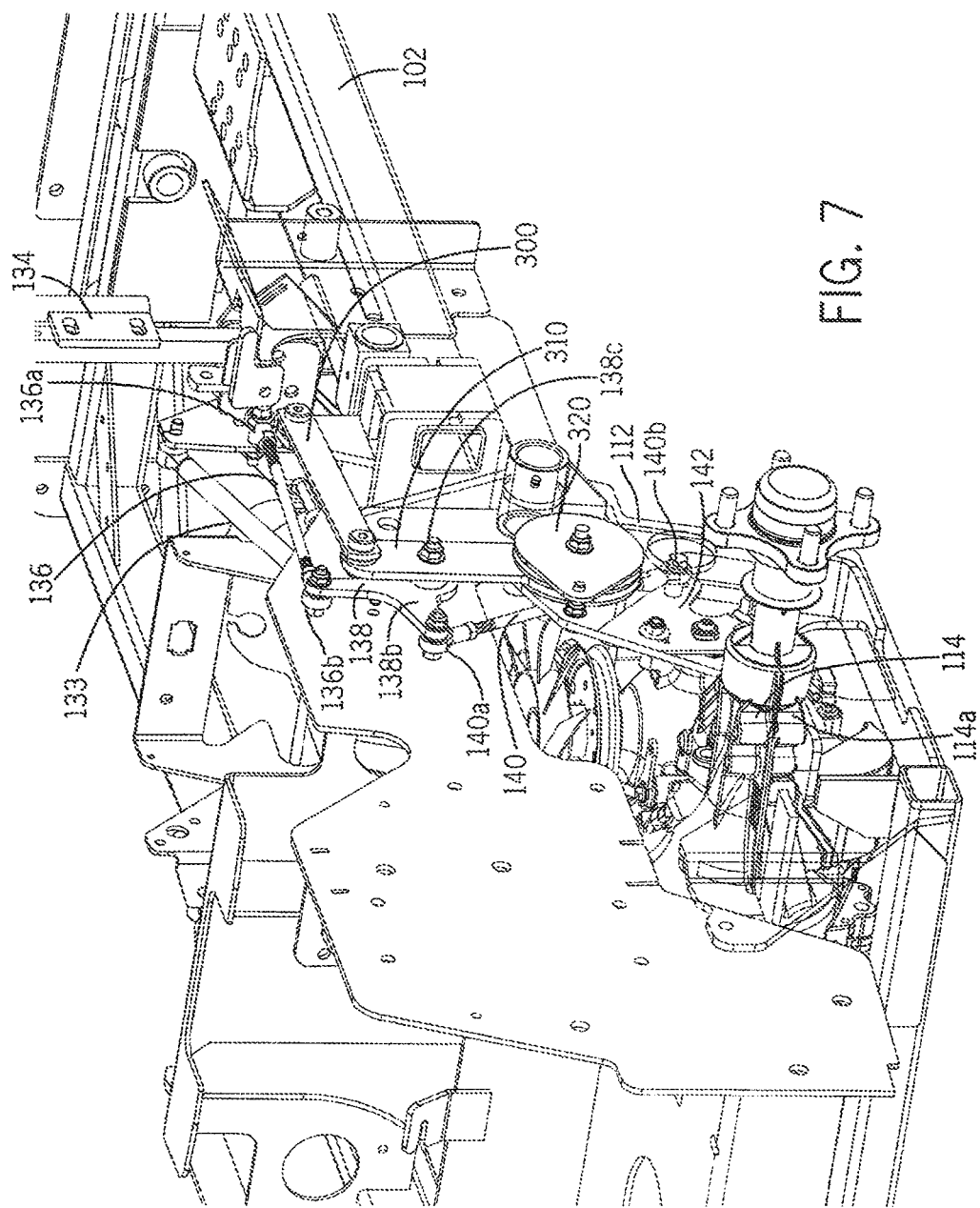

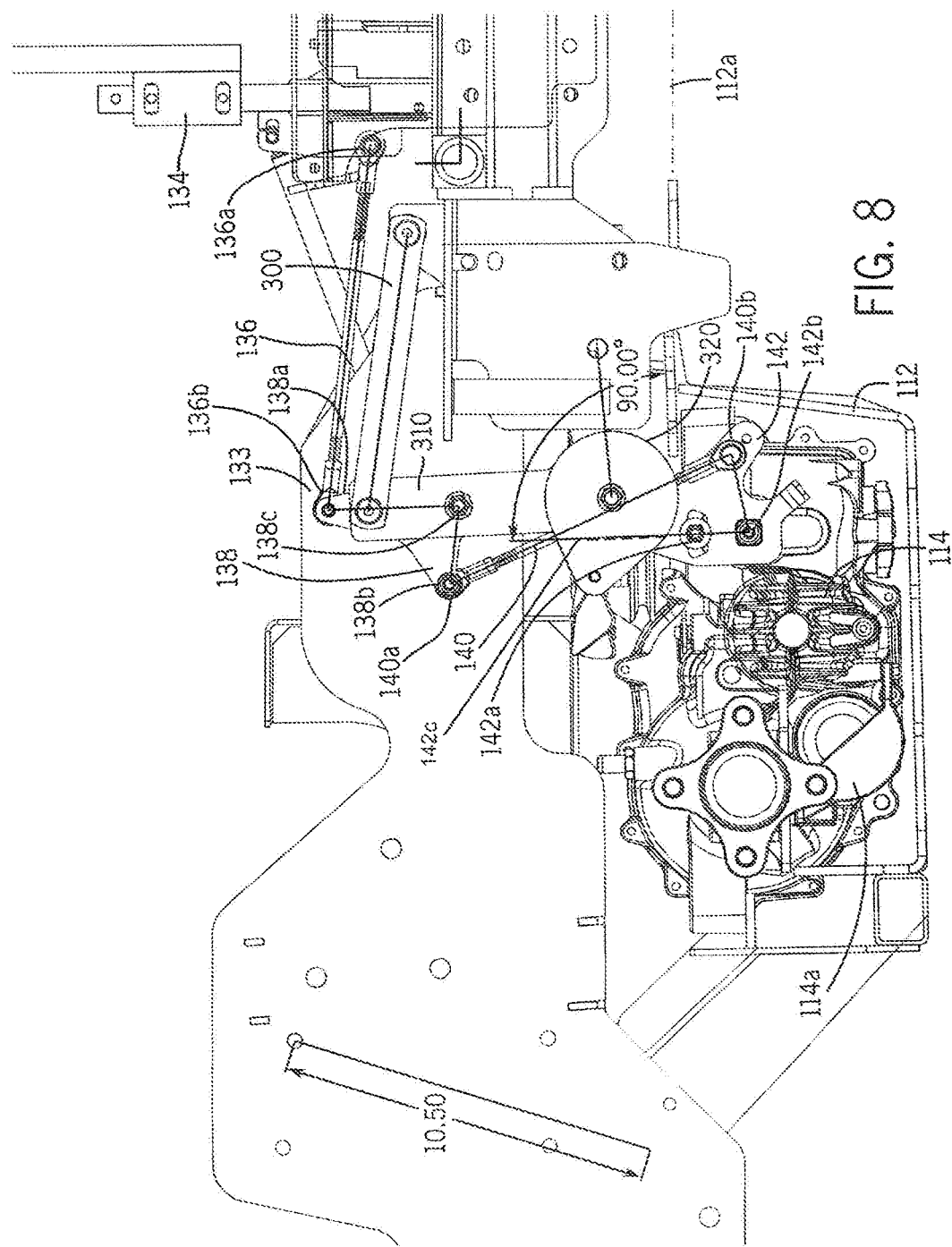

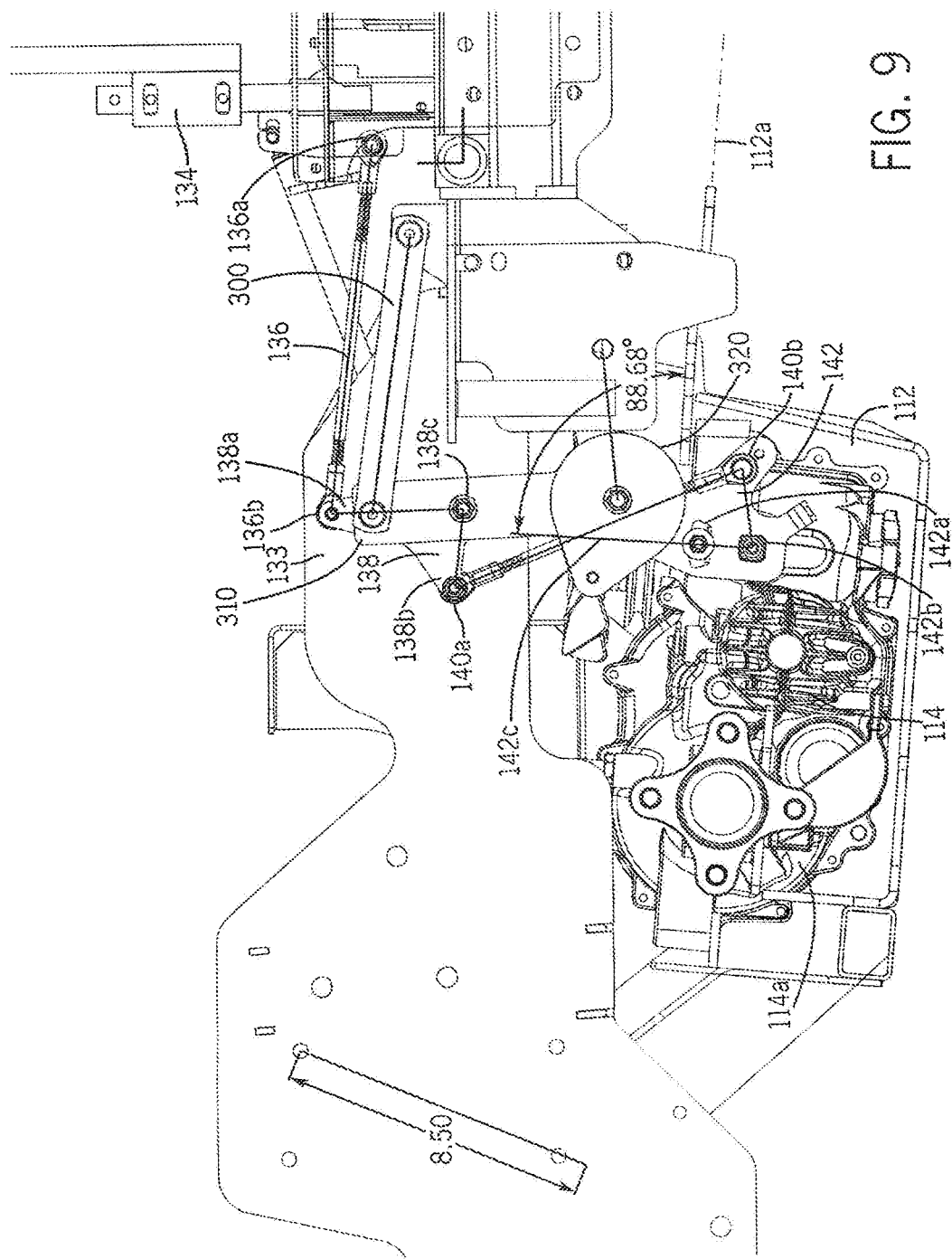

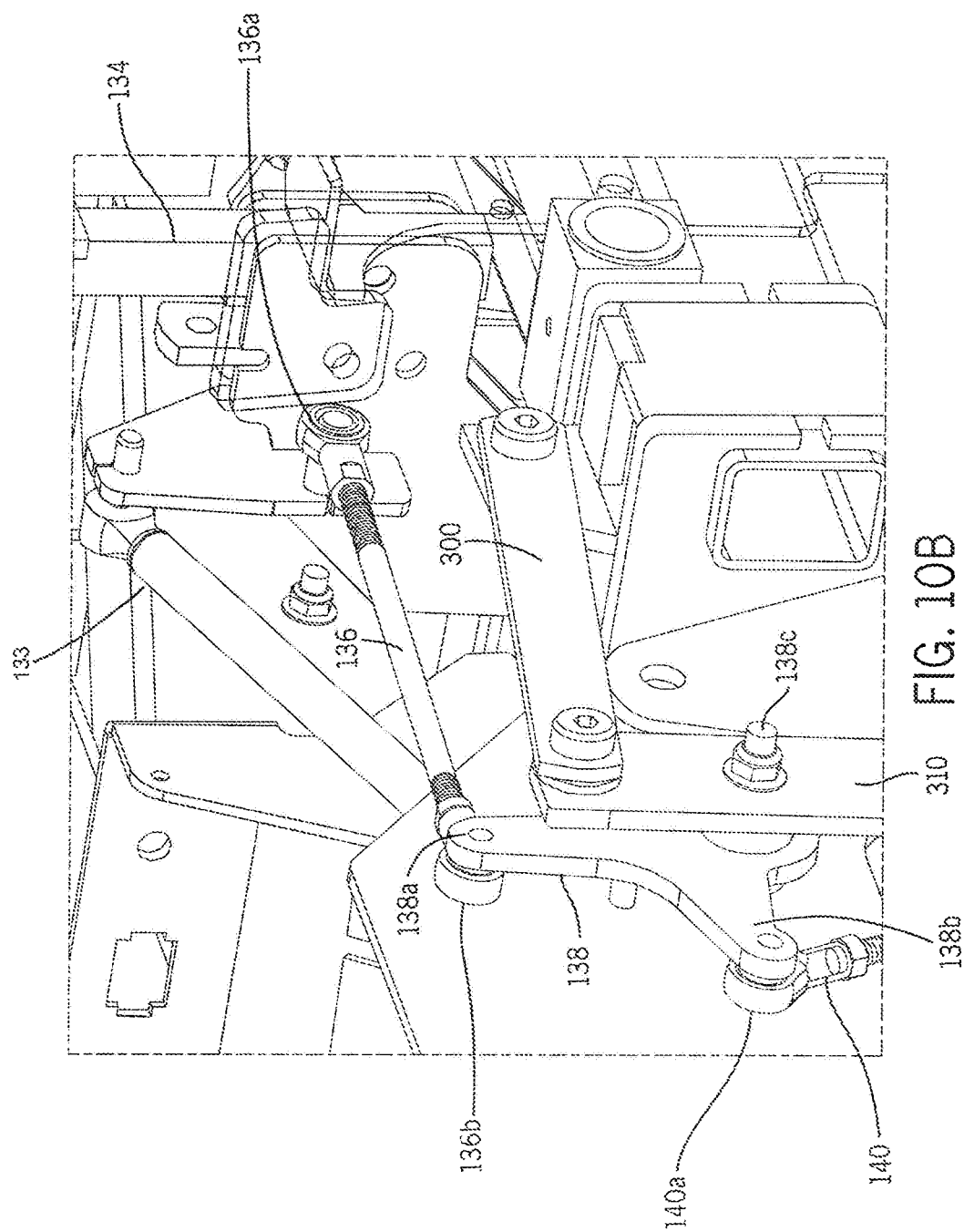

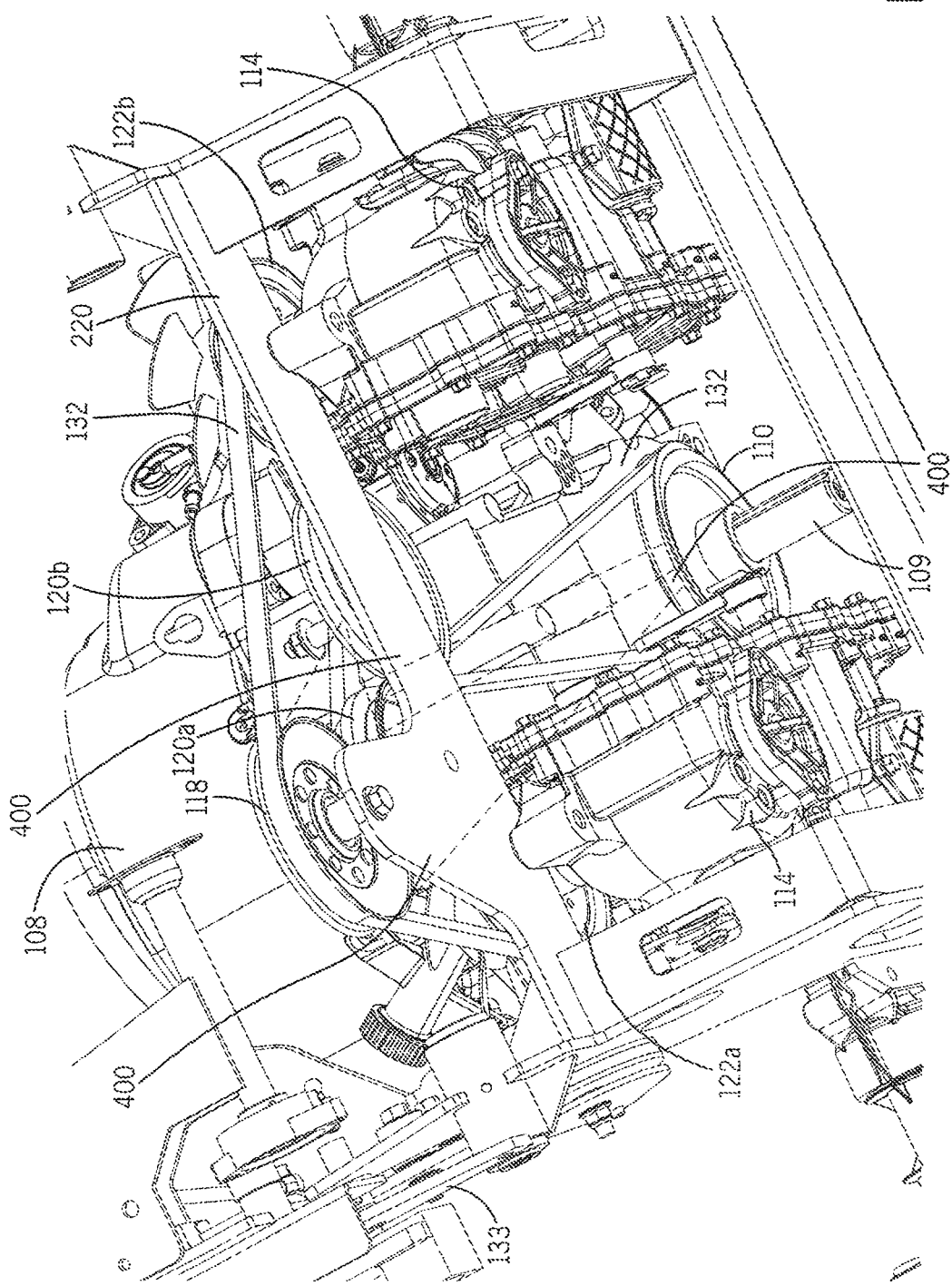

ZERO-TURN RADIUS LAWNMOWER WITH SUSPENSION SYSTEM

CROSS-REFERENCE TO RELATED APPLICATIONS

This application is a continuation of U.S. application Ser. No. 16/132,577, filed Sep. 17, 2018, which is a continuation of U.S. application Ser. No. 15/652,905, filed Jul. 18, 2017, which is a continuation of U.S. application Ser. No. 15/226,811, filed Aug. 2, 2016, which is a continuation-in-part of U.S. application Ser. No. 15/082,765, filed Mar. 28, 2016, which is a continuation-in-part of U.S. application Ser. No. 13/840,070, filed Mar. 15, 2013, which claims priority to U.S. Provisional Application No. 61/677,288, filed Jul. 30, 2012, and U.S. Provisional Application No. 61/643,809, filed May 7, 2012, all of which are incorporated herein by reference in their entireties.

BACKGROUND

Hydrostatic transaxles have become prevalent in the ZTR mower industry. Hydrostatic transaxles combine the hydraulic pump and one or more hydraulic wheel motors into a single unit, thereby simplifying and reducing the overall cost of the hydraulic system of ZTR mowers and other hydraulically-driven devices. The hydraulic pump of the hydraulic transaxle is mechanically driven by an internal combustion engine (or similar drive unit) via a belt-and-pulley system, and the hydraulic pump in turn drives the hydraulic motor for each drive wheel. However, due to the integration of the hydraulic pump and hydraulic wheel motors into a single unit, suspension of the drive wheels on a ZTR mower utilizing hydrostatic transaxles presents several challenges. One of the foremost challenges is the variation in belt angle between the drive pulley coupled to the power take-off shaft of the internal combustion engine, and the driven pulley(s) of the hydraulic pump on the hydrostatic transaxle. If the belt angle between the drive and driven pulley(s) is too great, the belt may run off of one or more of the pulleys and render the drive system inoperable, or may wear at an unacceptable rate. Due to these challenges, suspension of drive wheels driven by hydrostatic transaxles has been generally avoided.

SUMMARY

An embodiment relates to ride-on equipment including a pair of front wheels, a pair of rear wheels, a main frame, a subframe pivotally coupled to the main frame about a pivot axis, a power source, and a transaxle assembly. The power source is coupled to and supported by the main frame and includes a drive pulley. The transaxle assembly is configured to pivot with respect to the power source, is operably coupled to the pair of rear drive wheels, and includes at least one driven pulley. The drive pulley and the at least one driven pulley are operably coupled by a belt such that the at least one driven pulley of the transaxle assembly is configured to be driven by the drive pulley of the power source via the belt.

Another embodiment relates to ride-on equipment including a pair of front wheels, a first rear drive wheel, a second rear drive wheel, a main frame, a subframe pivotally coupled to the main frame about a pivot axis, a power source coupled to and supported by the main frame, and a transaxle assembly coupled to and supported by the subframe. The first rear drive wheel is operably coupled to the transaxle assembly via first drive axle ending along a first drive axis, and the second rear drive is operably coupled to the transaxle assembly via a second drive axle extending along a second drive axis. The pivot axis, the first drive axis, and the second drive axis are substantially parallel to each other.

Another embodiment relates to a zero-turn radius lawnmower including a first rear drive wheel, a second rear drive wheel, a main frame, a power source having a drive pulley, a mower deck coupled to the main frame, a first transaxle having a first driven pulley, a second transaxle having a second driven pulley, and a belt. The power source is attached to the main frame. The first transaxle is coupled to the first rear drive wheel along a first drive axis, and the second transaxle is coupled to the second rear drive wheel along a second drive axis. The belt is coupled to the drive pulley, the first driven pulley, and the second driven pulley such that the power source drives the first transaxle and the second transaxle via the belt. The first transaxle and the second transaxle are attached to the subframe such that the first transaxle and the second transaxle pivot with the subframe relative to the main frame. The pivot axis, the first drive axis, and the second drive axis are parallel to each other.

DESCRIPTION OF THE DRAWINGS

FIG. 4A shows a perspective view of ZTR mower components and suspension system in accordance with some embodiments of the invention.

FIG. 4B shows a partial perspective view of ZTR mower components and suspension system in accordance with some embodiments of the invention.

FIG. 5 shows a side sectional view of a suspension system in accordance with another embodiment of the invention.

FIG. 7 illustrates a perspective view of a hydrostatic transaxle control system in accordance with embodiments of the invention.

FIG. 8 shows a side sectional view of a hydrostatic transaxle control system in accordance with one embodiment of the invention.

FIG. 9 shows a side sectional view of a hydrostatic transaxle control system in accordance with another embodiment of the invention.

FIG. 10B illustrates a perspective close-up view of the upper portion of the compensated control linkage assembly in accordance with another embodiment of the invention.

FIG. 14B illustrates a close-up perspective view of a hydrostatic transaxle drive system in accordance with some embodiments of the invention.

DETAILED DESCRIPTION

Figure 1:
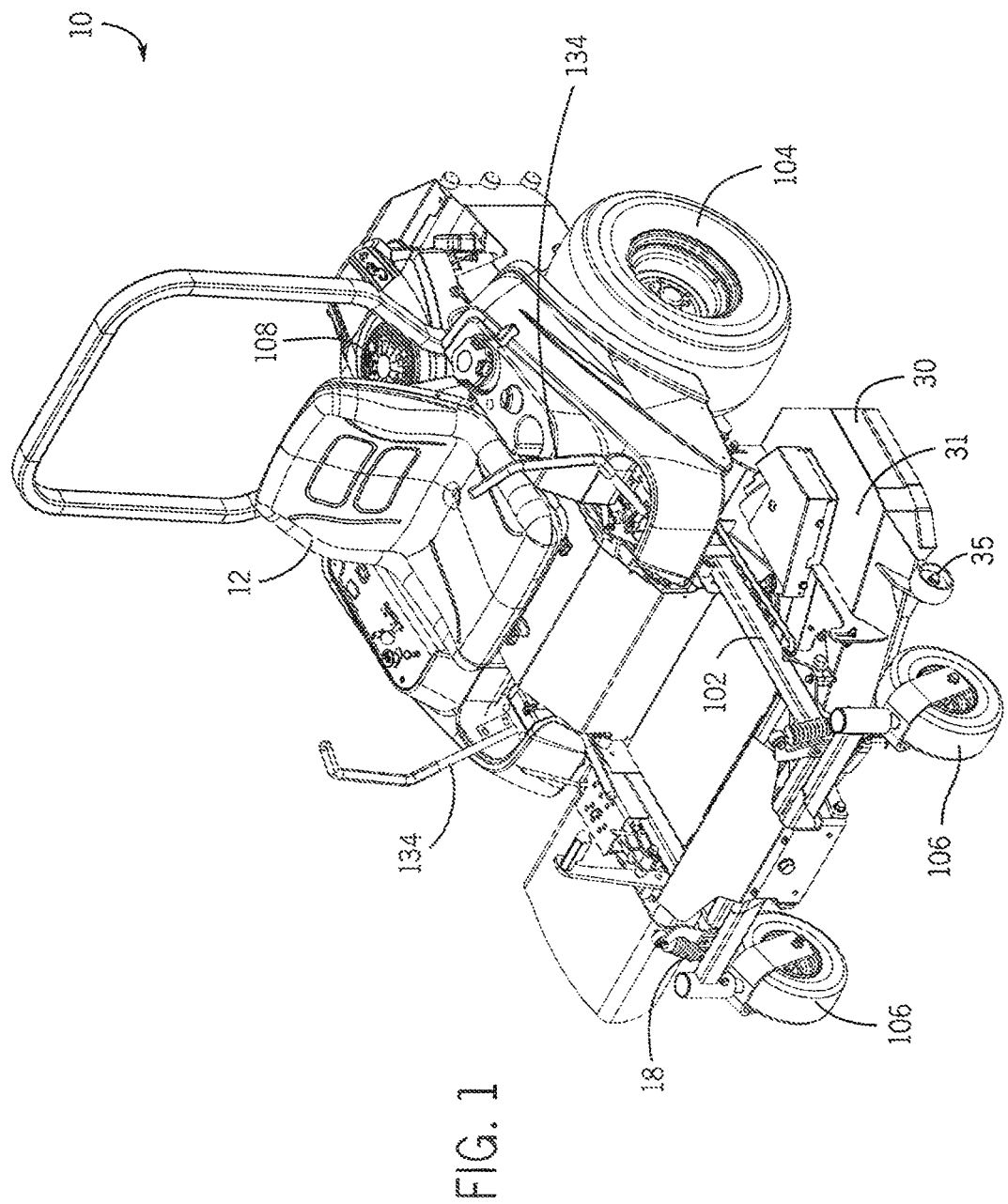
FIG. 1 illustrates an isometric view of a ZTR mower in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an isometric view of a ZTR mower 10 in accordance with some embodiments of the invention. The ZTR mower 10 can include a main frame 102, front caster wheels 106, and rear drive wheels 104 and a seat 12. The ZTR mower 10 can also include a mower deck 31 including a front cutter assembly 30 positioned between the front caster wheels 106 and rear wheels 104. Some embodiments can include front caster wheels 35 mounted to the front cutter assembly 30 that aid in maintaining the height of the front cutter assembly 30, thereby preventing damage from rocks and other large debris. In some embodiments, the ZTR mower 10 includes at least one power source. For example, in some embodiments, the mower 10 can include an engine, such as an internal combustion engine 108 shown behind the seat 12 in FIG. 1. In some embodiments, the engine 108 can be coupled to a power take-off shaft 109 (not shown). In some embodiments, the power take-off shaft 109 is coupled to at least one hydrostatic axles 114 (not shown) via an endless belt 132 (not shown). In some further embodiments, the ZTR mower 10 can also include left and right control paddles assemblies 134. In some further embodiments, the ZTR mower 10 can include alternative paddle assembly 134 arrangements.

Figure 2:
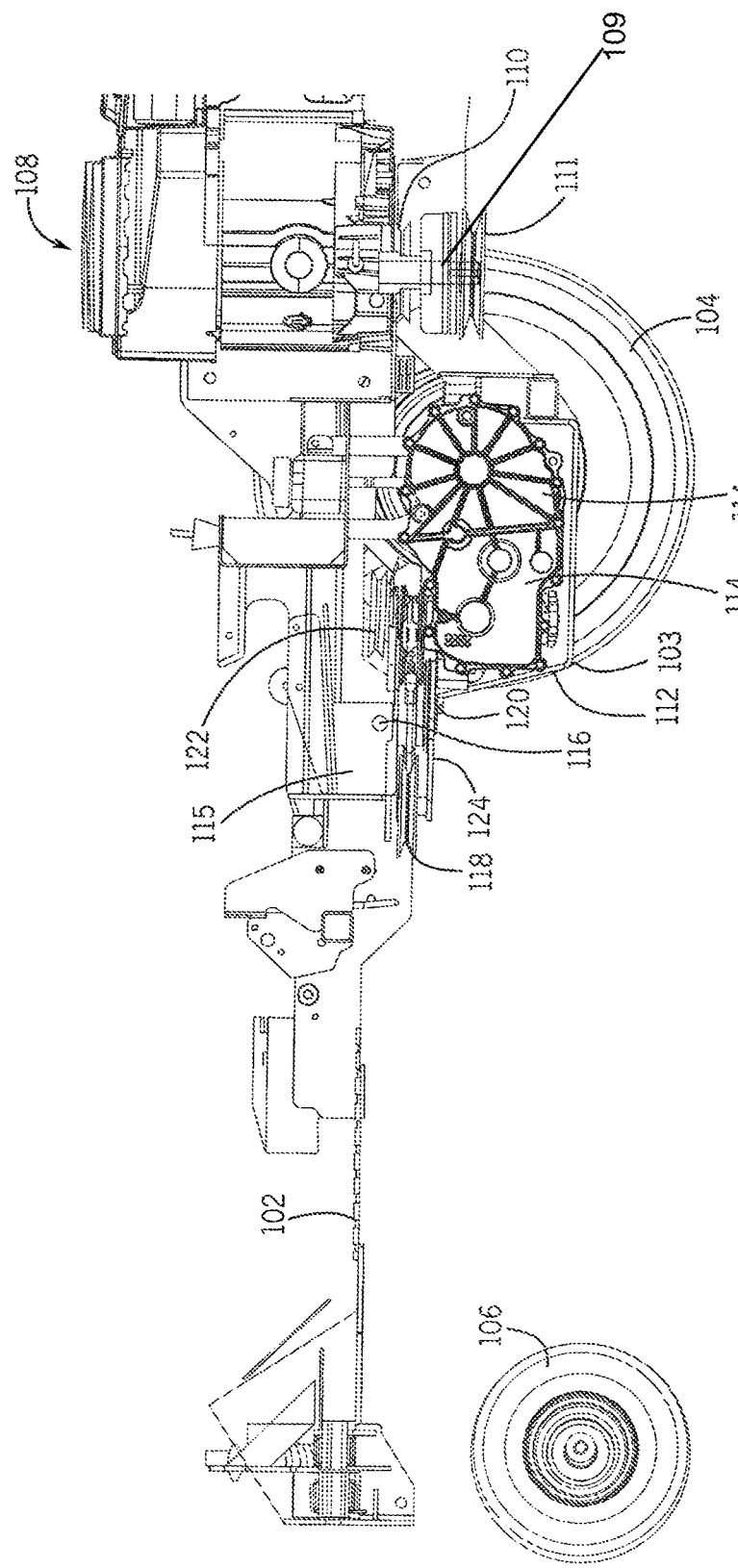
FIG. 2 illustrates a side sectional view of ZTR mower components in accordance with some embodiments of the invention.

FIG. 2 shows a side sectional view of various ZTR mower components in accordance with one embodiment of the invention. For ease of understanding, many conventional components commonly present in ZTR mowers (e.g., control handles, seat, mower deck, etc.) have been omitted from FIG. 2. However, one of ordinary skill in the art will readily understand that such conventional components may be included in the embodiments described herein. In some embodiments, the ZTR mower 10 of FIG. 2 comprises a main frame 102 supporting both rear drive wheels 104 and front caster wheels 106. In some embodiments, the main frame 102 further supports an internal combustion engine 108, which operates to drive both the drive wheels 104, other primary components, as well as one or more auxiliary components attached to the ZTR mower 10, such as the cutting blades of the front cutter assembly 30 (shown in FIG. 1). Some embodiments include the internal combustion engine 108 capable of driving the drive wheels 104 in addition to other components via one or more drive pulleys, including a drive pulley 110 mounted to a power take-off shaft 109 extending therefrom.

In some embodiments, the ZTR mower 10 as illustrated in FIG. 2 further includes a subframe 112 including a first axis 112a pivotally mounted to main frame 102 about a pivot 115 including a pivot axis 116. In some embodiments, the subframe 112 may be mounted to main frame 102 using an alternative technology that allows for substantially translational movement. In some embodiments, the subframe 112 supports thereon one or more transaxle assemblies 114a. For example, some embodiments include one or more hydrostatic transaxles 114. In some embodiments, the transaxles 114 contain both a hydraulic pump, a hydraulic valve (not shown), and a hydraulic motor (not shown) for powering the drive wheels 104. Some embodiments can include one or more belt idler pulleys 118 mounted on the subframe 112. In some further embodiments, the subframe 112 further supports one or more backside idler pulleys 120a, 120b. In other embodiments, idler pulley(s) 118 and backside idler pulleys 120a and 120b are attached to the subframe 112 via a spindle (not shown) to allow rotation of the pulley, and in some other embodiments, they can be attached via a plate 124, which may be integrally formed from the subframe 112. In some embodiments, idler pulley(s) 118 and backside idler pulleys 120a, 120b receive an endless belt 132 (not shown) that is driven by drive pulley 110 on the power take-off shaft 109 of internal combustion engine 108. In some embodiments, the endless belt 132 is also received by pulleys 122a, 122b coupled to the hydraulic pump of hydrostatic transaxle 114. In some embodiments of the invention, through this pulley-belt coupling, power from the internal combustion engine 108 is transferred to hydrostatic transaxle 114 via power take-off shaft 109 to operate drive wheels 104. In some other embodiments, alternative methods of driving hydrostatic transaxle 114, such as through a universal drive shaft can be used.

Figure 3:
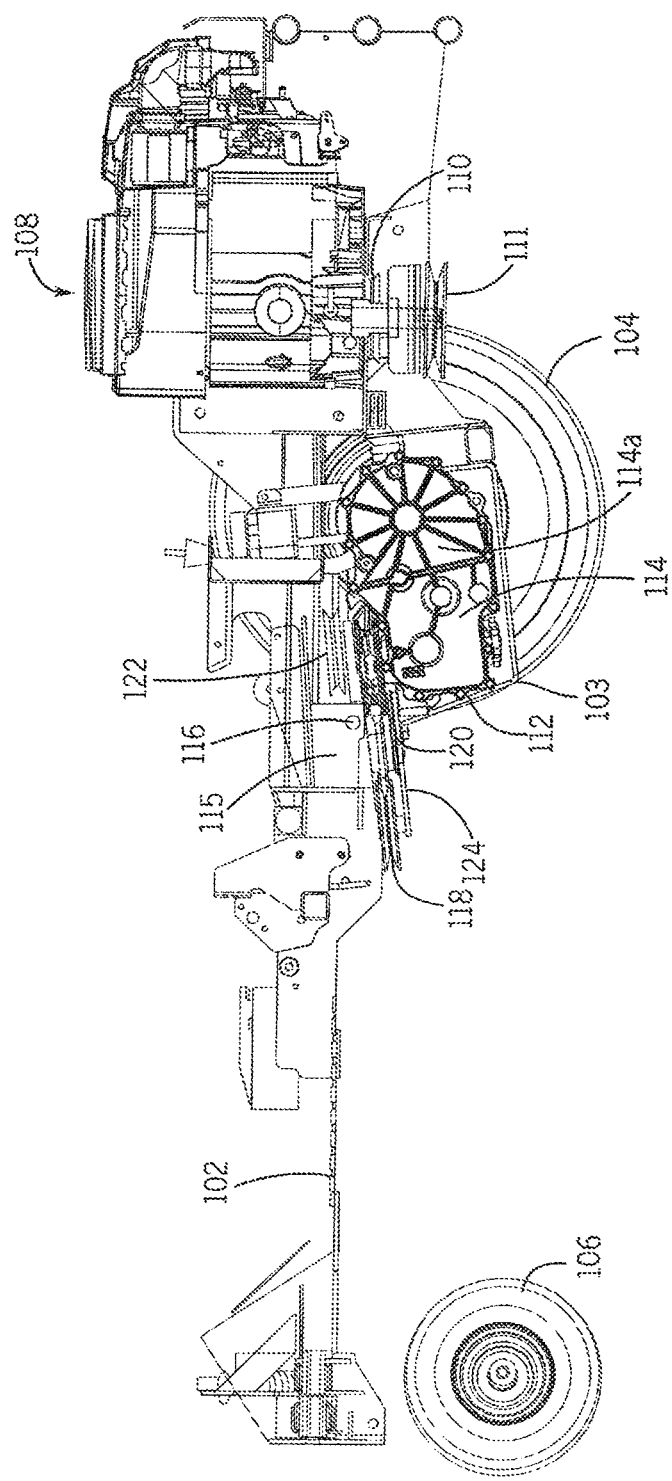
FIG. 3 illustrates a side sectional view of ZTR mower components in accordance with some embodiments of the invention.

FIG. 3 shows another side sectional view of various ZTR mower components in accordance with one embodiment of the invention. As illustrated in this view, the subframe 112 has travelled counterclockwise about pivot axis 116 to illustrate a compressed state of the suspension system 103. As can be seen, each of the components mounted on subframe 112 rotate about pivot axis 116, including idler pulley(s) 118, backside idler pulleys 120, and at least one driven pulley 122a, 122b on hydrostatic transaxle 114. In some embodiments, power is transmitted from the drive pulley 110 via an endless belt 132. In some embodiments, the endless belt 132 can be an "A" section belt, although in other embodiments, a "V" section belt, a flat belt, or other type of belt can be used.

In some embodiments, as the suspension travels, the belt angle only changes between the back side idler pulleys 120a, 120b and the drive pulley 110 where the distance between these particular pulleys is the greatest. Most notably, idler pulley(s) 118 and backside idler pulleys 120a,120b travel in the same plane (shown as pulley plane 400 in FIGS. 14A and 14B) as the driven pulley 122a, 122b upon rotation about pivot axis 116, which prevents belt misalignment between these pulleys when subframe 112 travels through its suspension arc. As described earlier, if the idler pulleys 118, 120a, 120b were to travel or rotate about a different plane than driven pulleys 122a, 122b on hydrostatic transaxle 114 (i.e. not within pulley plane 400), significant belt misalignment may cause the belt 132 to "jump" or run off of the pulley system and render the system inoperable. However, as shown in comparing FIG. 2 and FIG. 3, the only belt angle change between pulleys in the present embodiment would be between backside idler pulleys 120a,120b and drive pulley 110 mounted to the power take-off shaft 109. The risk of belt "jump" due to misalignment is greatly diminished under this construction because there is a significant distance between backside idler pulleys 120a,120b and drive pulley 110, thereby minimizing the belt angle change when subframe 112 travels through its suspension arc. Furthermore, in general, backside idler pulleys 120a,120b have a higher tolerance for belt angle changes during operation than other types of pulleys, and therefore the risk of the belt 132 decoupling is greatly diminished.

FIGS. 4A and 4B show perspective views of various ZTR mower components in accordance with one embodiment of the invention. As discussed previously, the subframe 112 is pivotally coupled to main frame 102 at a pivot 115 including a pivot axis 116. In some embodiments, the subframe 112 comprises a first support 214 including a first end 214a and a second end 214b, and a second support 216 having a first end 216a and a second end 216b. In some embodiments, the first support 214 and second support 216 are coupled by at least one substantially perpendicular and substantially horizontal third support 218. In some embodiments, the third support 218 is coupled to the second end 214b at a third support first end 218a, and the third support 218 is coupled to the second end 216b at a third support second end 218b. As discussed earlier, in some embodiments, the subframe 112 including a first axis 112a is pivotally mounted to the main frame 102 about a pivot 115 including a pivot axis 116. In some embodiments, a pivot 115 is coupled to the first end 214a of the first support 214 and the first end 216a of the second support 216.

In some further embodiments, the subframe 112 is further coupled to a motion absorbing suspension component. In some embodiments, the motion absorbing suspension component can include a compressible suspension component such as a coil spring-type suspension component 126. In some embodiments, a first end 126a of the compressible suspension component 126 is coupled to the main frame 102, and a second end 126b of the compressible suspension component is coupled to the subframe 112. In some embodiments, the suspension component 126 is coupled to a second end 214b of the first support 214 or a second end 216b of the second support 216, or both.

In the perspective view of FIG. 4A, the subframe 112 is shown extending continuously between both the right and left sides of main frame 102 to hold two hydrostatic transaxles 114, each of which can drive a separate drive wheel 104 (not shown). As shown, the subframe 112 holds both hydrostatic transaxles 114, each drive wheel 104 (not shown), and is translated about the suspension arc of subframe 112 as the ZTR mower 10 travels across varying terrain. In some embodiments, the subframe 112 need not extend continuously between the right and left sides of the main frame 102.

Figure 6:
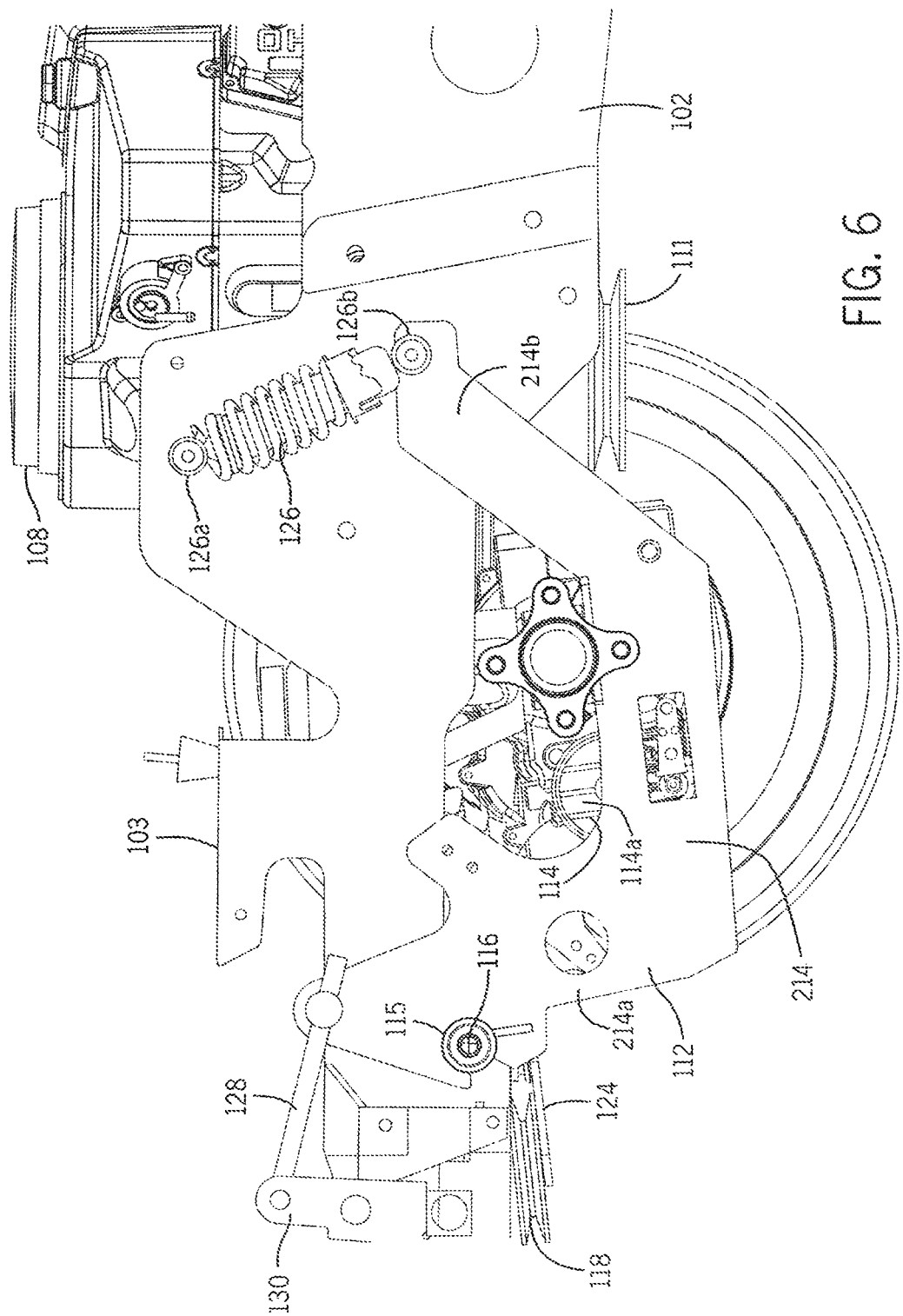
FIG. 6 shows a side sectional view of a suspension system in accordance with another embodiment of the invention.

FIG. 5 shows another side sectional view of the suspension system 103 according to one embodiment of the invention. In some embodiments, one of the drive wheels 104 has been omitted from the figure for clarity. As shown, in some embodiments, a compressible suspension component, such as the coil spring-type suspension component 126 is pivotally coupled to both main frame 102 (shown as 126a) and subframe 112 (shown as 126b). This arrangement allows for restricted rotation of subframe 112 about pivot axis 116. In some other embodiments, the coil spring-type suspension component 126 can be replaced by any appropriate shock absorber. In some embodiments, the subframe 112 is pivotally coupled to a link 128, which is in turn pivotally coupled to a bell crank 130. Some embodiments include link 128 and bell crank 130 coupled to a mower deck (not shown) to allow corresponding movement of the mower deck in association with movement of subframe 112. FIG. 6 shows a similar side sectional view as that depicted in FIG. 5, but with coil spring-type suspension component 126 in a compressed position. Again, a comparison between FIG. 5 and FIG. 6 clearly shows that all components mounted upon subframe 112 rotate about pivot axis 116, including any desired idler pulleys (not shown) and the hydrostatic transaxle 114.

As discussed earlier, in some embodiments, the mower 10 can include a front cutter assembly 30 (FIG. 1 illustrates an isometric view of ZTR mower 10 in accordance with some embodiments of the invention and shows a front cutter assembly 30 positioned between the front caster wheels 106 and rear wheels 104). As shown in FIG. 5 and FIG. 6, some embodiments of the invention include an auxiliary pulley 111. In some embodiments, the auxiliary pulley 111 can be coupled to the engine 108 via a power transfer assembly (e.g. a clutch assembly not shown) to enable the rotational torque of the power take-off shaft 109 to drive the cutter assembly 30 by an endless belt (not shown). In some embodiments, a user can control the coupling of the engine 108 to the cutter assembly 30 through a conventional power transfer assembly, and in some further embodiments, the user can control the rotational speed of the auxiliary pulley 111 to control the cutter assembly 30. In some other embodiments, further auxiliary pulleys can be coupled to the power take-off shaft 109. In other embodiments, one or more further auxiliary pulleys (not shown) can be coupled to one or more further conventional auxiliary components (not shown).

In some embodiments, the mower 10 can include other features. For example, in some embodiments, a control linkage assembly 133 can be used to control the power provided by an internal combustion engine 108. For example, FIG. 7 shows a perspective view of a control linkage assembly 133 for operator control of hydrostatic transaxle 114. In some embodiments, one or more hydrostatic transaxles 114 that combine a hydraulic pump (not shown) and hydraulic wheel motor (not shown) into a single unit, are coupled to the engine 108 by a pulley and belt drive assembly 117. In some embodiments, an operator can deploy one or more control paddles 134 to manipulate at least one hydrostatic transaxle 114 to drive the drive wheels 104 (not shown). In some embodiments, an operator can deploy one or more control paddles 134 to manipulate at least one hydrostatic transaxle 114 to move in either a forward or reverse direction, or to remain neutral. In some embodiments, one or more control paddles 134 coupled to the ZTR mower 10 can be coupled to a hydrostatic transaxle pump valve (not shown) to allow the control of hydraulic fluid from one or more hydraulic pumps (not shown) within the hydrostatic axles 114.

As shown previously in FIGS. 4-6, in some embodiments, when the mower 10 traverses a terrain, or when mower 10 is loaded and unloaded, the main frame 102 can move with respect to the subframe 112. For example, when an operator mounts the mower 10, or if additional weight or equipment is loaded onto the mower 10, the frame 102 can move with respect to the subframe 112. Furthermore, during loading of the mower 10, in some embodiments, the coil spring-type suspension component 126, pivotally coupled to both main frame 102 with the pivot 115, can compress, and the subframe 112 can pivot about the pivot axis 116 on pivot 115. In some embodiments, because the subframe 112 can change the orientation of hydrostatic transaxle 114 during a compressed condition, any direct linkage to hydrostatic transaxle 114 may cause an undesirable actuation of the hydrostatic transaxle pump valve (not shown) if one or more control paddle(s) 134 were to be directly coupled to hydrostatic transaxle 114. Such an undesirable actuation of the hydrostatic transaxle pump valve may be unperceivable when the ZTR mower 10 is moving, however it can become significantly more noticeable when the ZTR mower 10 is in the parked or neutral condition. In the parked or neutral condition, compression of subframe 112 may occur due to operator movement, or some other shifting of weight on the rear of the mower 10. If a direct linkage from control paddle(s) 134 to hydrostatic transaxle 114 was used during such parked or neutral conditions, this weighting of the rear of the mower 10 may cause the linkage to open the hydrostatic transaxle pump valve enough to cause the machine to "lurch" until an unsuspended condition is again reached.

In some embodiments of the invention, a compensated control linkage system 133 can be used that comprises a first control linkage 136, including a first end 136a and a second end 136b, wherein the first end 136a is coupled to control paddle assembly 134, and the second end 136b is coupled to a first end 138a of a bell crank 138. In some embodiments, the bell crank 138 is pivotally coupled to a component that is coupled to the subframe 112 via a pivot axis 138c. For example, as shown in FIG. 10b, the bell crank 138 can be pivotally coupled to the compensator arm 310 by pivot point 138c. In some embodiments, a second end 138b of a bell crank 138 can be coupled to a first end 140a of a second control linkage 140. In some further embodiments, the second end 140b of a second control linkage 140 can be coupled to a second bell crank (bell crank 142) used in operation of the hydrostatic transaxle pump valve (not shown). Most notably, in some embodiments, the compensated control linkage system 133 straddles two regions of the mower 10 that are supported around a pivoting component, pivot 115 including pivot axis 116, the main frame 102 and the subframe 112. Some embodiments include a first control linkage 136 coupled via first end 136a to a paddle assembly 134 that is anchored to one region (the main frame 102). Some embodiments also include the second end 136b of first control linkage 136 coupled to a bell crank 138 that is directly coupled to compensator arm 310, which is anchored to the subframe 112. Therefore, in some embodiments, the bell crank 138 interposed between the first control linkage 136 and second control linkage 140 as described above can compensate for movement of subframe 112 and rotation about pivot axis 116.

The embodiments as described can be further illustrated in FIG. 8 and FIG. 9 showing detailed side sectional views of the compensated control linkage assembly 133 in accordance with one embodiment of the invention. As shown, FIG. 8 illustrates the mower 10 in an "uncompressed" condition (generally corresponding to the illustration of the suspension system 103 as shown in FIG. 5, showing a suspension component 126 in a generally extended, uncompressed condition). In some embodiments, the shock length of the embodiments shown in FIGS. 8 and 5 can be 10.5 inches, and in this uncompressed condition, a 90 degree reference angle I is achieved between the couplings of bell crank 142 (shown as 142a and 142b) and a first axis 112a on subframe 112. This position signifies a neutral condition of the mower when uncompressed. Conversely, FIG. 9 shows a "compressed" condition of the mower 10 (generally corresponding to the illustration of the suspension system 103 as shown in FIG. 6, showing a suspension component 126 in a generally shortened, compressed condition). In some embodiments, the shock length of the embodiments shown in FIGS. 9 and 6 can be 8.5 inches, and in this compressed condition, an 88.68 degree reference angle I is achieved between operable couplings of bell crank 142 (shown as 142a and 142b, second axis 142c) and the first axis 112a on subframe 112. In some embodiments, this change of angle I of 1.32 degrees between the uncompressed and compressed conditions does not result in the mower "lurching", as discussed above. In some embodiments, the second end 138b of the bell crank 138 is coupled to the first end 140a of the second control linkage 140, and the second end 140b of the second control linkage 140 is coupled to the bell crank 142 coupled to the conventional hydrostatic transaxle pump valve (not shown).

In some embodiments as described, the compensated control linkage system 133 can compensate for movement of the subframe 112. Without this compensation, the degree change between the uncompressed and compressed conditions of the suspension system 103 would be significant enough to cause undesirable movement of the mower in some instances during the parked or neutral condition. While a change of angle I of 1.32 degrees as shown in FIG. 9, it is also possible for a compensated control linkage assembly 133 to be configured to achieve various changes of angle I, dependent upon the hydrostatic transaxle type and style. For example, an angular displacement of less than 1.32 degrees of angle I (e.g., zero degrees or substantially close to zero degrees) could be achieved, or an angular displacement of angle I of greater than 1.32 degrees could be achieved for a hydrostatic transaxle capable of tolerating such a displacement without imparting movement on the drive wheels 104. In some embodiments, the compensated control linkage assembly 133 is configured and arranged to reduce and eliminate the amount of angle I change on the control paddle 134 when the suspension system 103 including a suspension component 126 compresses and decompresses, and the shock length decreases and increases. In some further embodiments (not shown), the amount of angle change can be further reduced or eliminated with other adjustments to the linkage positions and lengths. For example, by adjusting the length and travel distance of the first control linkage 136, the second control linkage 140, and by modifying the rotational circumference of the bell crank 138 or bell crank 142, the amount of change of angle I can be adjusted.

Figure 10A:
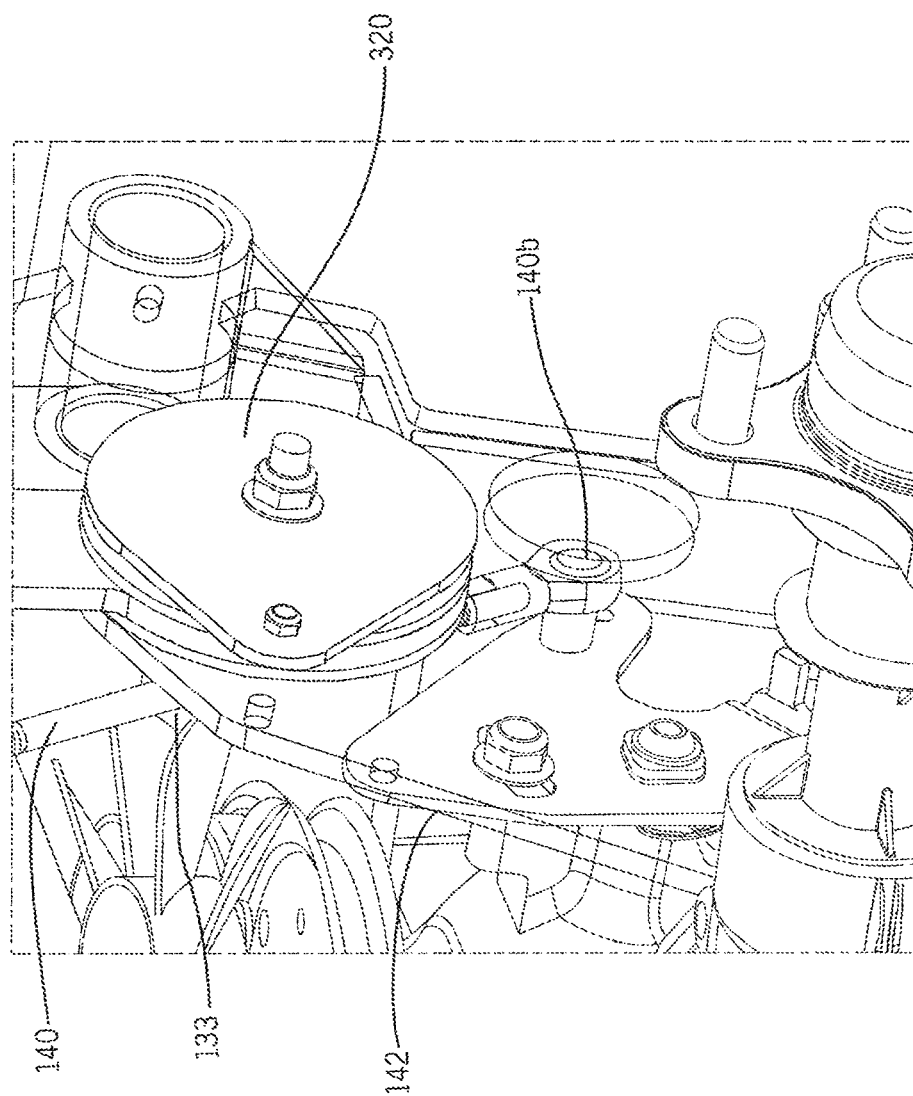
FIG. 10A illustrates a perspective close-up view of the lower portion of the compensated control linkage assembly in accordance with another embodiment of the invention.

FIG. 10A illustrates a perspective close-up view of the lower portion of the compensated control linkage assembly 133 and FIG. 10B illustrates a perspective close-up view of the upper portion of the compensated control linkage assembly 133. As shown, some embodiments of the invention include a variety of support components. For example, as shown in FIG. 10B, bell crank 138 can be pivotably mounted to compensator arm 310, which is further coupled to compensator link 300. As shown in FIG. 10A, the compensator arm 310 can be coupled to a compensator lock 320. In some other embodiments, the compensated control linkage assembly 133 including first control linkage 136, bell crank 138, second control linkage 140 and bell crank 142 can be coupled to the main frame 102 and the subframe 112 using alternative couplings.

Figure 11:
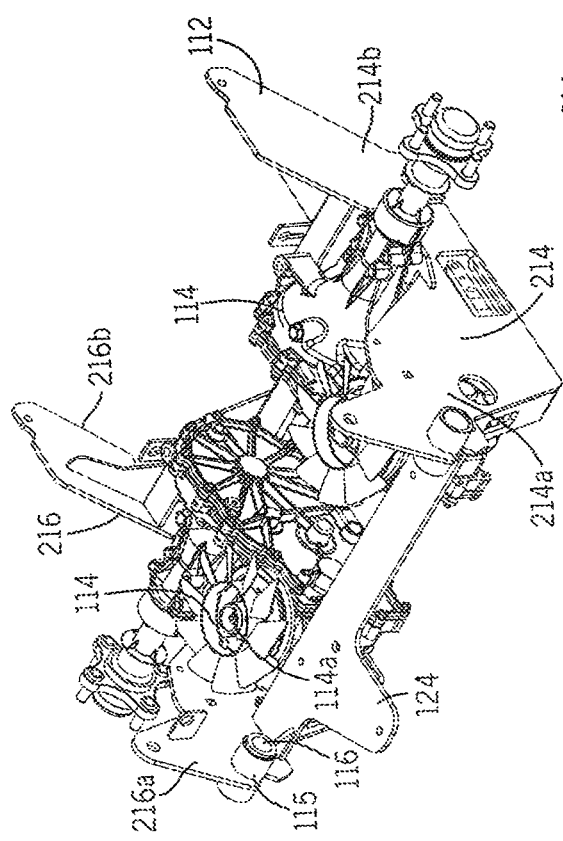
FIG. 11 illustrates a perspective view of a subframe and hydrostatic transaxles in accordance with some embodiments of the invention.
Figure 12:
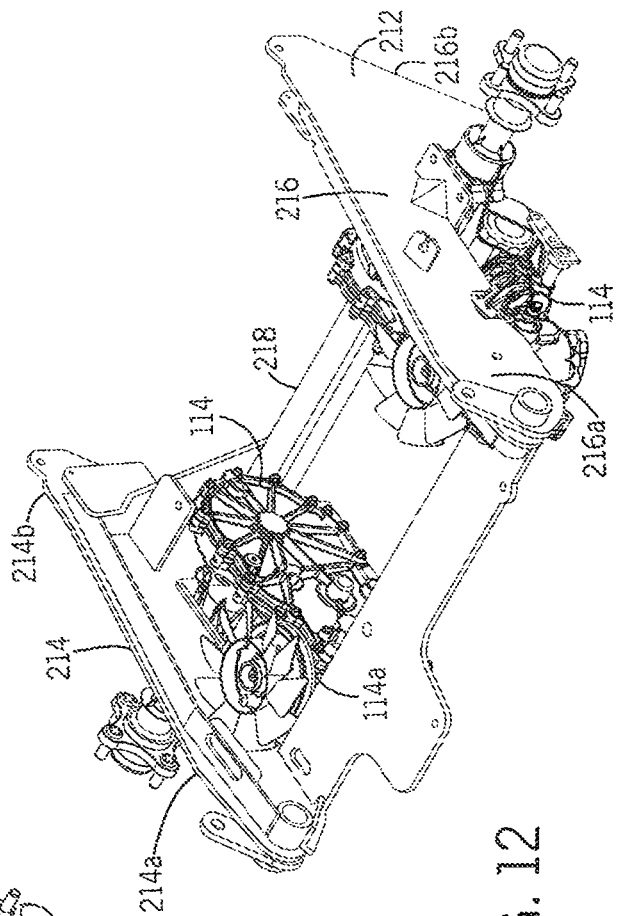
FIG. 12 illustrates a perspective view of a subframe and hydrostatic transaxles in accordance with some embodiments of the invention.

Some embodiments can feature alternative suspension systems 103. For example, referring to FIG. 11, showing a perspective view of the subframe 112 and hydrostatic transaxle 114, the hydrostatic transaxles 114 are mounted to subframe 112 from below. In some other embodiments, as shown in FIG. 12 the hydrostatic transaxles 114 are mounted to a subframe 212 from above, which may account for variations in ZTR mower design, size, etc. Some other embodiments can feature alternative subframe 112 designs and alternative hydrostatic transaxles 114 designs. In some embodiments, the subframe 112 and hydrostatic transaxle 114 can be coupled in other ways. One of ordinary skill in the art will understand that while the illustrated embodiments are directed to ZTR mowers, many embodiments of the invention are equally useful with other types of mowers as well.

As discussed earlier in reference to FIG. 3, illustrating a compressed state of the suspension system 103, in some embodiments, each of the components mounted on subframe 112 rotate about pivot axis 116 when compressed. This includes idler pulley(s) 118, backside idler pulleys 120a, 120b, and driven pulleys 122a,122b on hydrostatic transaxles 114. Hence, in some embodiments, idler pulley(s) 118 and backside idler pulleys 120a,120b travel in the same pulley plane 400 as driven pulleys 122a,122b upon rotation about pivot axis 116. Because the pulleys 118, 120a, 120b travel in the same pulley plane 400, in some embodiments, the change in the belt 132 angle is minimized when the subframe 112 travels through its suspension arc, and therefore belt 132 misalignment is also minimized. As described earlier, if the idler pulleys 118, 120a, 120b were to travel or rotate about a different plane than driven pulley 122a,122b (i.e. pulley plane 400) on hydrostatic transaxle 114, then significant belt 132 misalignment (caused by a belt 132 angle change) may encourage the belt 132 to "jump" off of the pulley system, thereby rendering the system inoperable. However, as described earlier in FIGS. 2 and 3, in some embodiments, the only belt 132 angle change between pulleys in the present embodiment would be between backside idler pulleys 120a, 120b and drive pulley 110 mounted to the power take-off shaft 109. The risk of belt 132 "jump" due to misalignment is greatly diminished under this configuration because there is a significant distance between backside idler pulleys 120a, 120b and drive pulley 110, thereby minimizing the belt 132 angle change when subframe 112 travels through its suspension arc (i.e. during a change of angle I). Furthermore, the significant distance between the drive pulley 110 and the backside idler pulleys 120a, 120b maintains the angle of the endless belt 132 to 3 degrees or less, and prevents belt 132 misalignment between these pulleys when subframe 112 travels through its suspension arc. Moreover, backside idler pulleys 120a,120b have a higher tolerance for belt 132 angle changes during operation than other types of pulleys.

Figure 13:
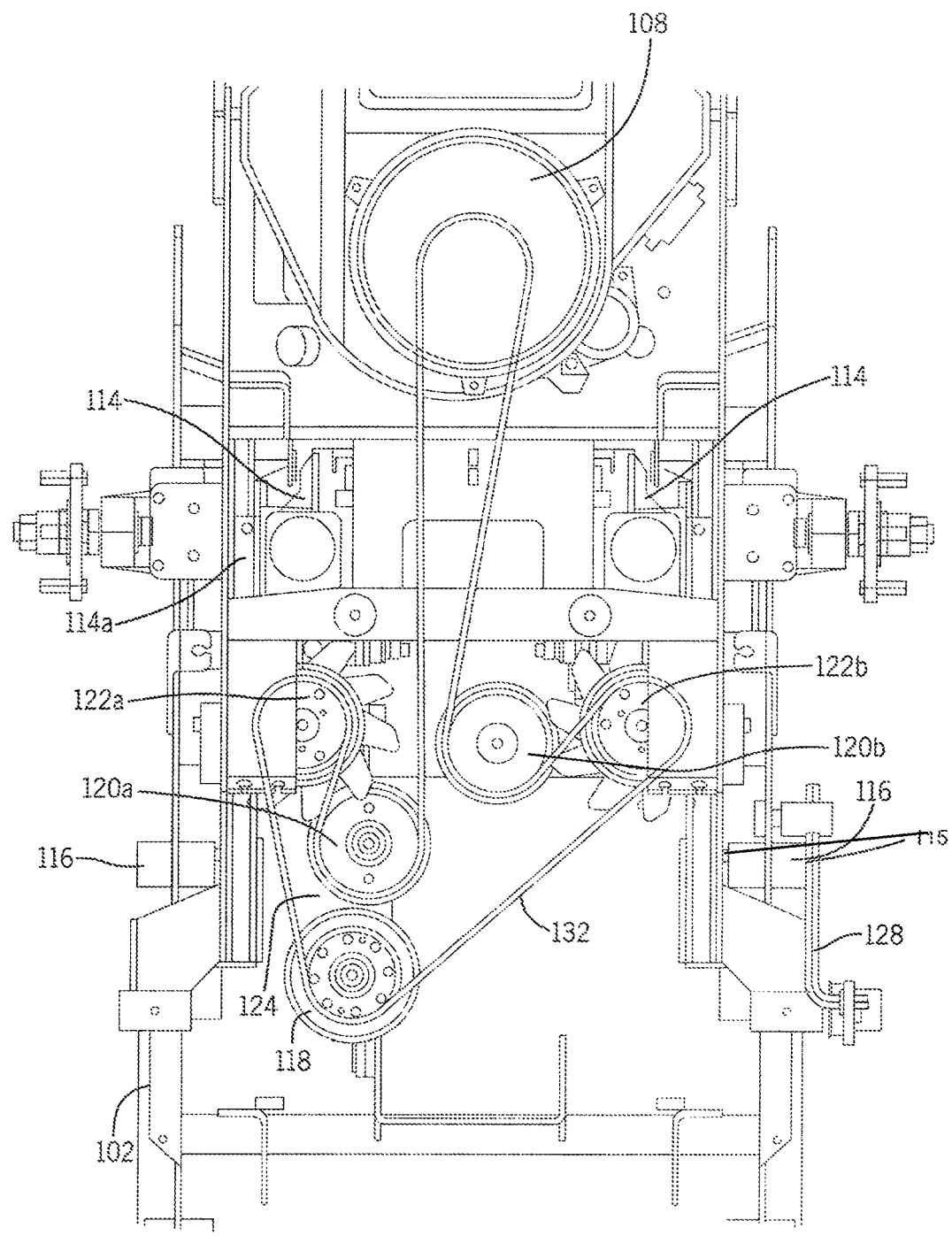
FIG. 13 illustrates a top sectional view of the hydrostatic transaxle drive system components in accordance with some embodiments of the invention.

Some embodiments of the invention can be seen in FIG. 13, showing a top sectional view of the hydrostatic transaxle drive system components, including further details of the pulley and belt drive assembly 117. Specifically, FIG. 13 shows the location of the backside idlers 120a,120b and their positional relationship with the engine 108, and the drive pulley 110 (illustrated as endless belt 132 curvature over the engine 108) according to some embodiments of the invention. As shown, in some embodiments, the endless belt 132 can be coupled between the drive pulley 110 coupled to an internal combustion engine 108, backside idler pulleys 120a, 120b, idler pulley 118, and driven pulley 122a,122b on hydrostatic transaxle 114. As detailed above, backside idler pulleys 120a,120b, idler pulley 118, and driven pulleys 122a,122b on hydrostatic transaxle 114 each travel in the same pulley plane 400 while the subframe 112 travels about its suspension arc. Thus, in some embodiments, the only change in angle of endless belt 132 occurs between drive pulley 110 coupled to internal combustion engine 108 and backside idler pulley 120a,120b. However, in some embodiments, because of the significant distance between drive pulley 110 and backside idler pulleys 120a,120b, made possible by the placement of backside idler pulleys 120a, 120b near pivot 115 and pivot axis 116 on suspended subframe 112, the change in belt 132 angle during suspended operation is minimized. Accordingly, the likelihood of belt slip or "jump" due to belt 132 angle change is also minimized.

Figure 14A:
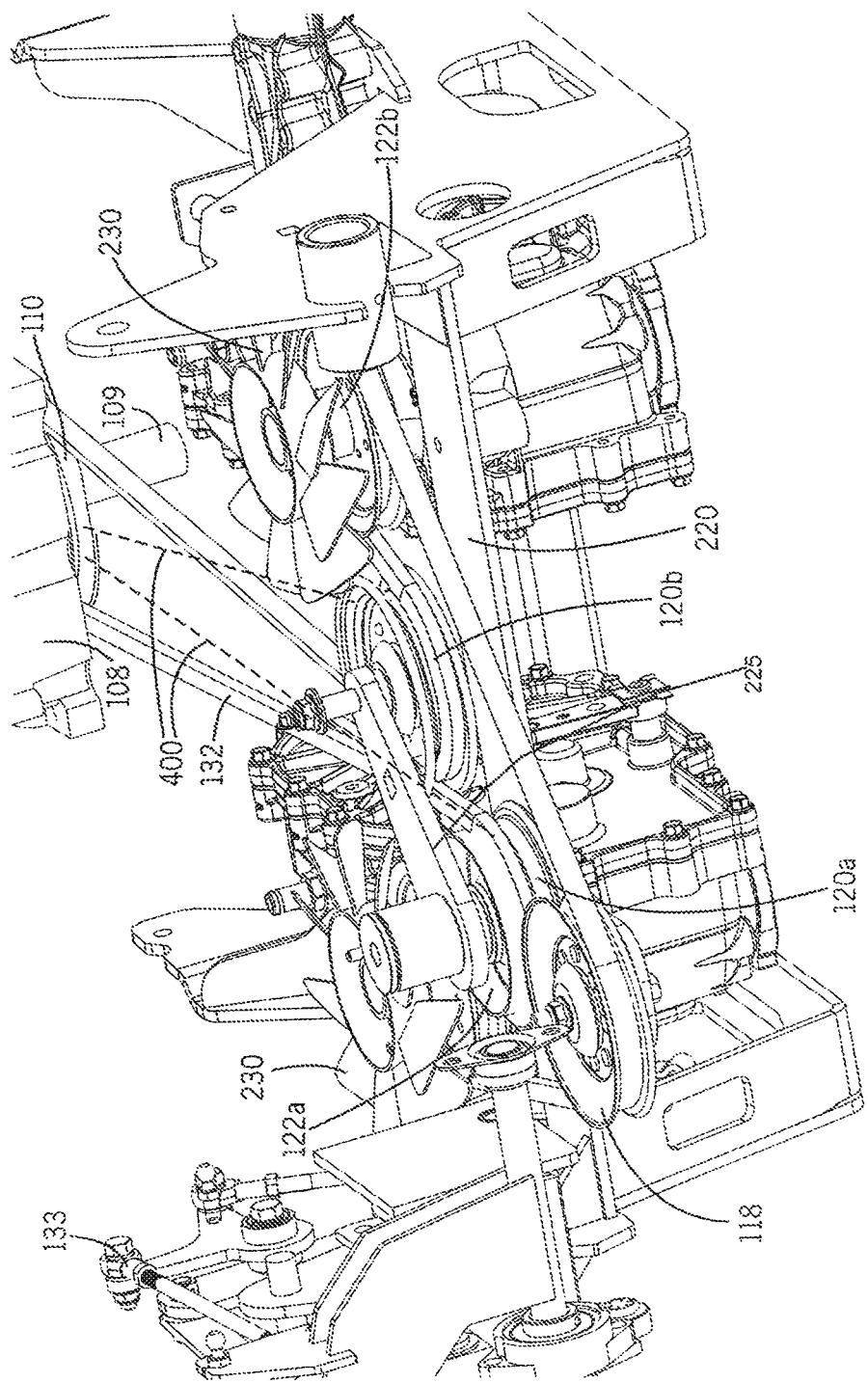
FIG. 14A illustrates a close-up perspective view of a hydrostatic transaxle drive system in accordance with some embodiments of the invention.

Further views of the various hydrostatic transaxle drive system components including the pulley and belt drive assembly 117 can be seen in FIGS. 14A and 14B. As shown, in some embodiments, one or more hydraulic drive systems can comprise a drive pulley 110, coupled to a power take-off shaft 109, coupled to an engine 108. In some embodiments, the drive pulley 110 can be coupled to one or more pulley and idle pulleys coupled to one or more hydrostatic transaxles 114. For example, as shown in FIGS. 14A and 14B, in some embodiments, the drive pulley 110 can be coupled to backside idler pulleys 120a,120b, driven pulleys 122a,122b, and belt idler pulley 118, all of which can be positioned a significant distance from the drive pulley 110.

In some embodiments, idler pulley(s) 118 and backside idler pulleys 120a and 120b are attached to the subframe 112 via a conventional spindle (not shown) to allow rotation of the pulleys. In some other embodiments, they can be attached via a plate 124 to front suspension mount 220. In some embodiments, idler pulley(s) 118 and backside idler pulleys 120a, 120b receive an endless belt 132 (not shown) that is driven by drive pulley 110 on the power take-off shaft 109 of internal combustion engine 108. In some further embodiments, the endless belt 132 is also received by driven pulleys 122a, 122b coupled to the hydraulic pump (not shown) of hydrostatic transaxle 114. As described earlier, in some embodiments, the only belt 132 angle change between pulleys in the present embodiments would be between backside idler pulleys 120a, 120b, and drive pulley 110 mounted to the power take-off shaft 109. As previously described, the significant distance between backside idler pulleys 120a, 120b and drive pulley 110 minimizes the belt 132 angle change when subframe 112 travels through its suspension arc.

As described previously, in some embodiments, the ZTR mower 10 includes at least one power source such as an internal combustion engine 108, and in some embodiments, the internal combustion engine 108 can power a take-off shaft 109 coupled to at least one hydrostatic transaxle 114 via an endless belt 132. In alternative embodiments, the at least one power source can include a current source and the ZTR mower 10 can be driven through the rear drive wheels 104 by at least one electric drive assembly (not shown). For example, in some embodiments, a current source comprising at least one battery (not shown) can be supported by the main frame 102 and be capable of being electrically coupled to at least one conventional electric drive assembly (not shown) including at least one electric motor (not shown). In some embodiments, the at least one battery can be electrically coupled to the at least one electric motor using at least one electrical harness (not shown).

In some embodiments, the at least one power source can include at least one rechargeable battery. In some embodiments, the at least one rechargeable battery can be at least partially charged from an external power supply. For example, in some embodiments, the ZTR mower 10 can included a main frame 102 supporting at least one rechargeable battery that can be at least partially charged from an electrical outlet or another source of electricity. In some other embodiments, the ZTR mower 10 can include an onboard power supply. For example, in some embodiments, the ZTR mower 10 can include rechargeable battery supported by the main frame 102 that can be at least partially charged from an internal combustion engine 108. In some embodiments, the engine 108 can be electrically coupled to at least one onboard current generator or an alternator (not shown) powered by the engine 108. In some embodiments, the onboard current generator can be capable of at least partially recharging the at least one battery. In some other embodiments, the onboard current generator can be at least partially able to power the at least one electric motor independently, or via the at least one rechargeable battery. In some embodiments, the at least one rechargeable battery resides within the subframe 112, and the engine 108 is resides outside of the subframe 112, supported on the main frame 102. In some other embodiments, the engine 108 can be electrically coupled to at least one onboard current generator powered by the engine 108, further coupled to at least one rechargeable battery mounted to the subframe. In some embodiments, the rechargeable battery can be recharged by the engine 108 via the current generator.

Some embodiments of the invention include a subframe 112 pivotally coupled to a main frame 102 about a pivot axis of a ride-on equipment that includes at least one electric motor supported by the subframe 112. In some embodiments, the at least one electric motor is electrically coupled to at least one battery positioned external to the subframe 112 and supported by the main frame 102. In some embodiments, the electric motor is configured and arranged to be powered by the at least one battery for driving at least one wheel 104 and the pivot axis resides substantially between the at least one electric motor and the at least one battery.

In some other embodiments, the ZTR mower 10 can include at least one drive shaft (not shown) coupled to at least one drive wheel 104. In some embodiments, the main frame 102 includes at least one at least one power source such as an internal combustion engine 108, and in some embodiments, the engine 108 can be coupled to the drive shaft. Some embodiments of the invention include a subframe 112 pivotally coupled to a main frame 102 about a pivot axis of a ride-on equipment. In some embodiments, the engine 108, supported by the main frame 102, but unsupported by the subframe 112, is coupled to at least one wheel 104 coupled to the subframe 112. In some embodiments, the at least one wheel is driven by the drive shaft coupled to the engine 108 and the pivot axis resides substantially between the at least one wheel and the engine 108.

In some alternative embodiments of the invention, the subframe 112 can be formed from two separate pivotal platforms, one for each hydrostatic transaxle, to allow for independent suspension of each drive wheel. Further, embodiments of the invention that include an independent suspension of each drive wheel, other variations in the pulley arrangement can be included to account for movement of two separate pivotal platforms. For example, in reference to FIGS. 15-23, some embodiments include an alternative suspension system 1103 that can include two independent first and second subframes 1112a, 1112b each separately coupled to a main frame 1102. This arrangement can enable each hydrostatic transaxle to be mounted on a separate subframe so that any coupled drive wheel can respond to motion and suspension forces independently.

Figure 15:
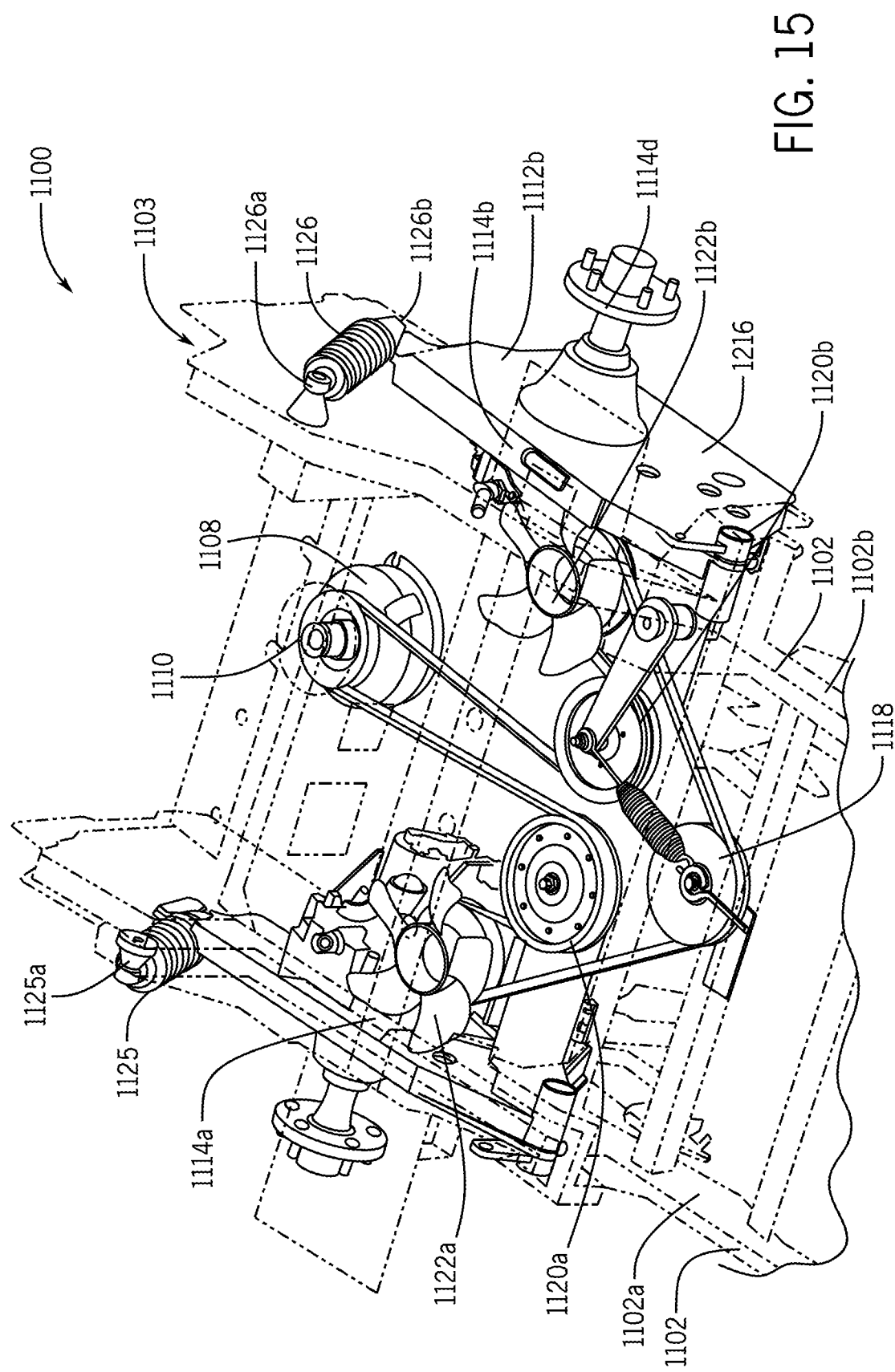
FIG. 15 illustrates a partially transparent perspective view of a portion of a suspension system of a ZTR mower in accordance with some embodiments of the invention.

FIG. 15 illustrates a partially transparent perspective view 1100 of a portion of a suspension system 1103 of a ZTR mower 10 in accordance with some embodiments of the invention. For ease of understanding, many conventional components commonly present in ZTR mowers (e.g., control handles, seat, mower deck, etc.) have been omitted from FIG. 15. However, one of ordinary skill in the art will readily understand that such conventional components may be included in the embodiments described herein. In some embodiments, the suspension system 1103 comprises a main frame 1102 that can support the front and rear wheels of a mower (e.g., such as both the front caster wheels 106 and the rear drive wheels 104 of ZTR mower 10.) In this instance, the main frame 1102 can be used in place of the main frame 102 within the ZTR mower 10 to support an internal combustion engine 1108, along with one or more drive systems that can be configured to operate to move the ZTR mower 10 (e.g., using drive wheels 104). Further, the main frame 1102 can support other primary components, as well as one or more auxiliary components attached to the ZTR mower 10, such as the cutting blades of the front cutter assembly 30 (shown in FIG. 1).

Figure 16:
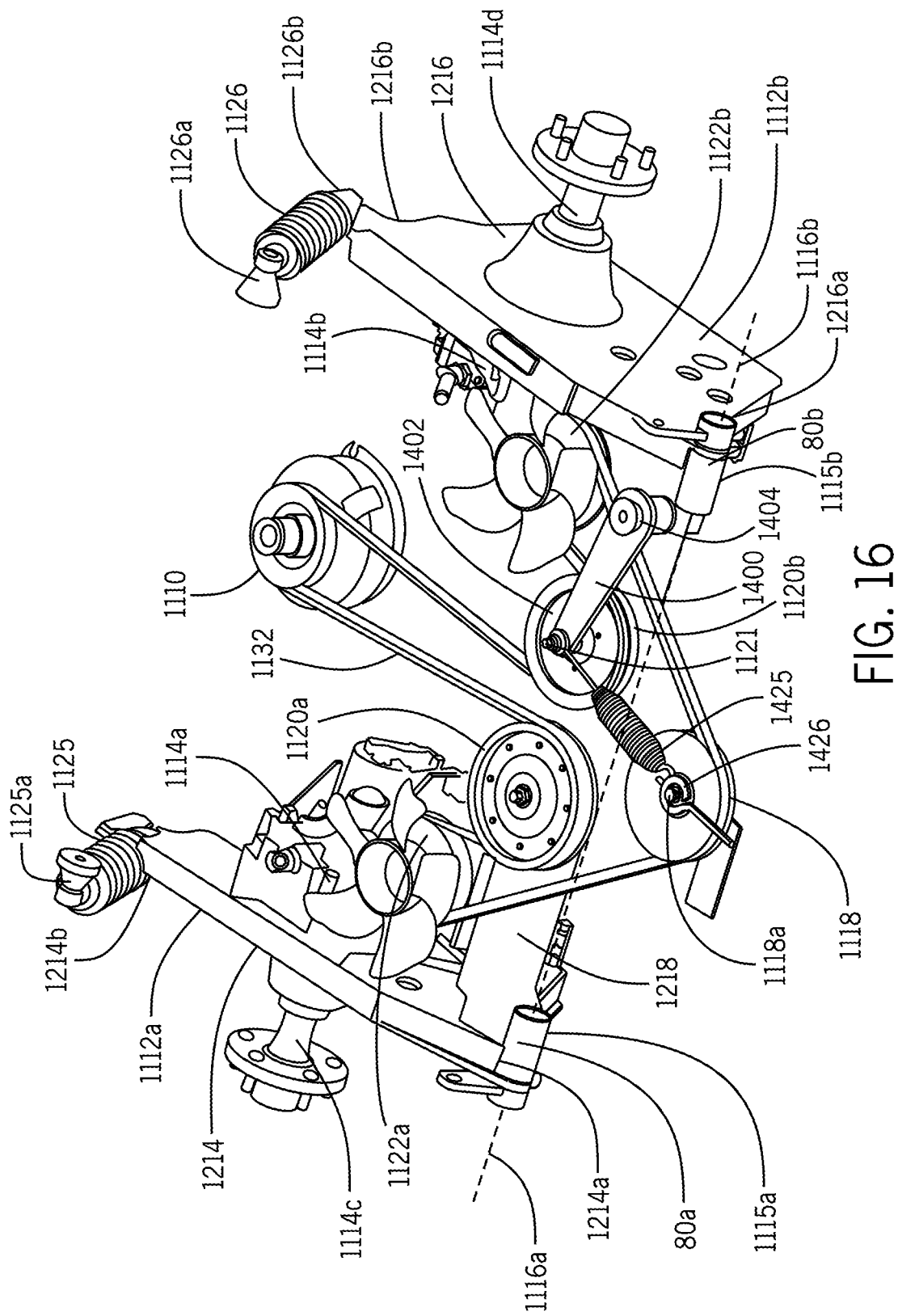
FIG. 16 illustrates a perspective view of components of a suspension system of a ZTR mower in accordance with some embodiments of the invention.
Figure 17:
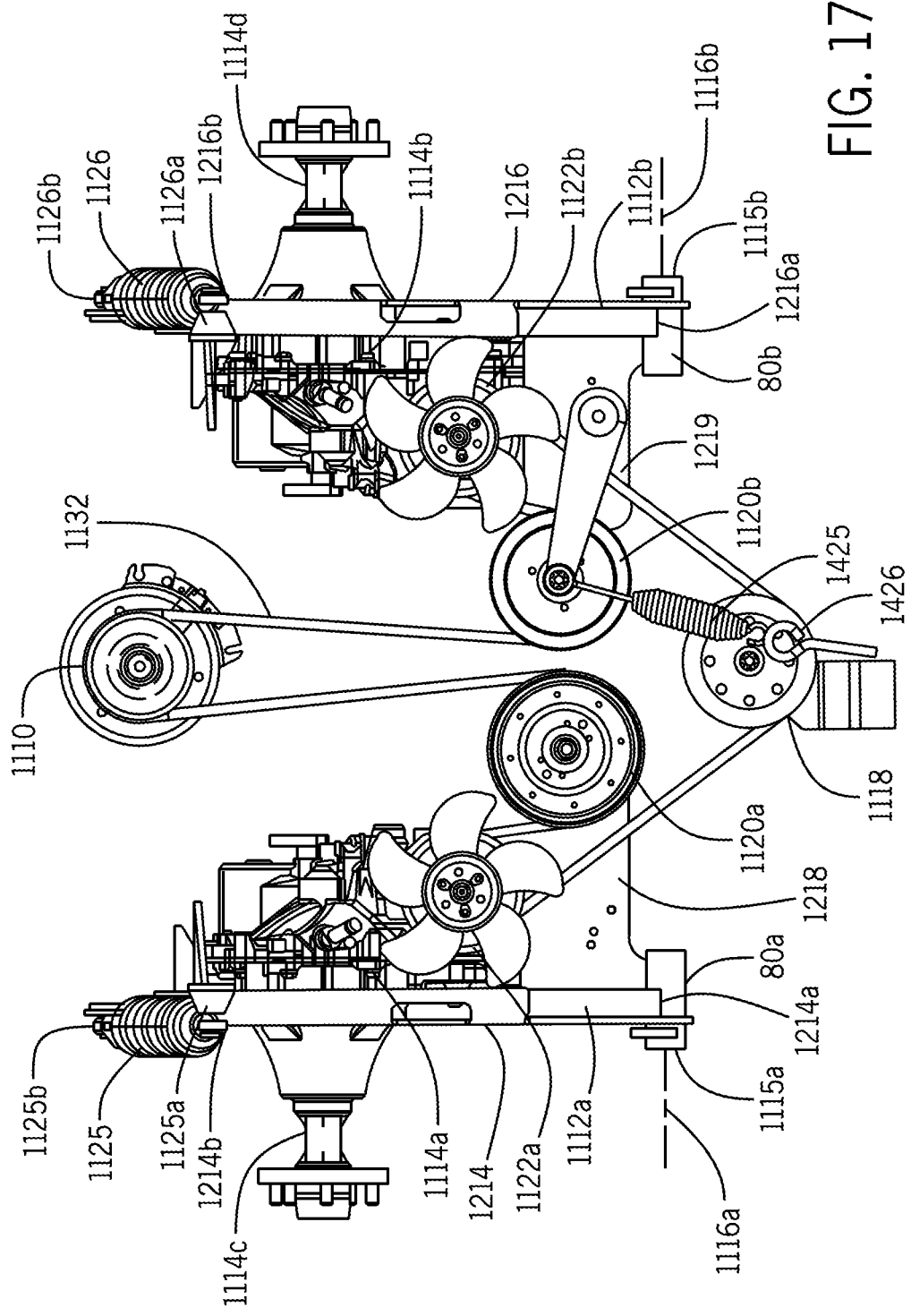
FIG. 17 illustrates a top view of components of a suspension system of a ZTR mower in accordance with some embodiments of the invention.

FIG. 16 illustrates a perspective view of components of the suspension system 1103 of a ZTR mower 10 in accordance with some embodiments of the invention, and FIG. 17 illustrates a top view of components of the suspension system 1103 of a ZTR mower 10 in accordance with some embodiments of the invention. In some embodiments, the suspension system 1103 can include a first subframe 1112a coupled to a side 1102a of the main frame 1102. In some embodiments, the first subframe 1112a can comprise a support member 1214 including a first end 1214a and a second end 1214b. In some embodiments, the first subframe 1112a can be pivotally mounted to the main frame 1102 to allow for translational movement of the subframe 1112a with respect to the main frame 1102. In some embodiments, a pivot 1115a can be located proximate the first end 1214a that can enable the first subframe 1112a to pivot around the pivot axis 1116a when coupled to a portion or region of the main frame 1102. Thus, in some embodiments, the first subframe 1112a, and anything supported by the first subframe 1112a, can be allowed to pivot about the main frame 1102 on a pivot axis 1116a using the pivot 1115a.

In some embodiments, the suspension system 1103 can include another subframe independent of the first subframe 1112a. For example, in some embodiments, the suspension system 1103 can include a second subframe 1112b coupled to another and/or opposite side of the main frame 1102 (side 1102b). In some embodiments, the second subframe 1112b can comprise a support member 1216 including a first end 1216a and a second end 1216b. In some embodiments, the second subframe 1112b can be pivotally mounted to the main frame 1102 to allow for translational movement of the subframe 1112b with respect to the main frame 1102. In some embodiments, a pivot 1115b can be positioned proximate the first end 1216a. The pivot 1115b can enable the second subframe 1112b to pivot around a pivot axis 1116b when coupled to a portion or region of the main frame 1102. Thus, in some embodiments, the second subframe 1112b, and anything supported by the second subframe 1112b, can be allowed to pivot about the main frame 1102 on a pivot axis 1116b using the pivot 1115b.

Figure 18:
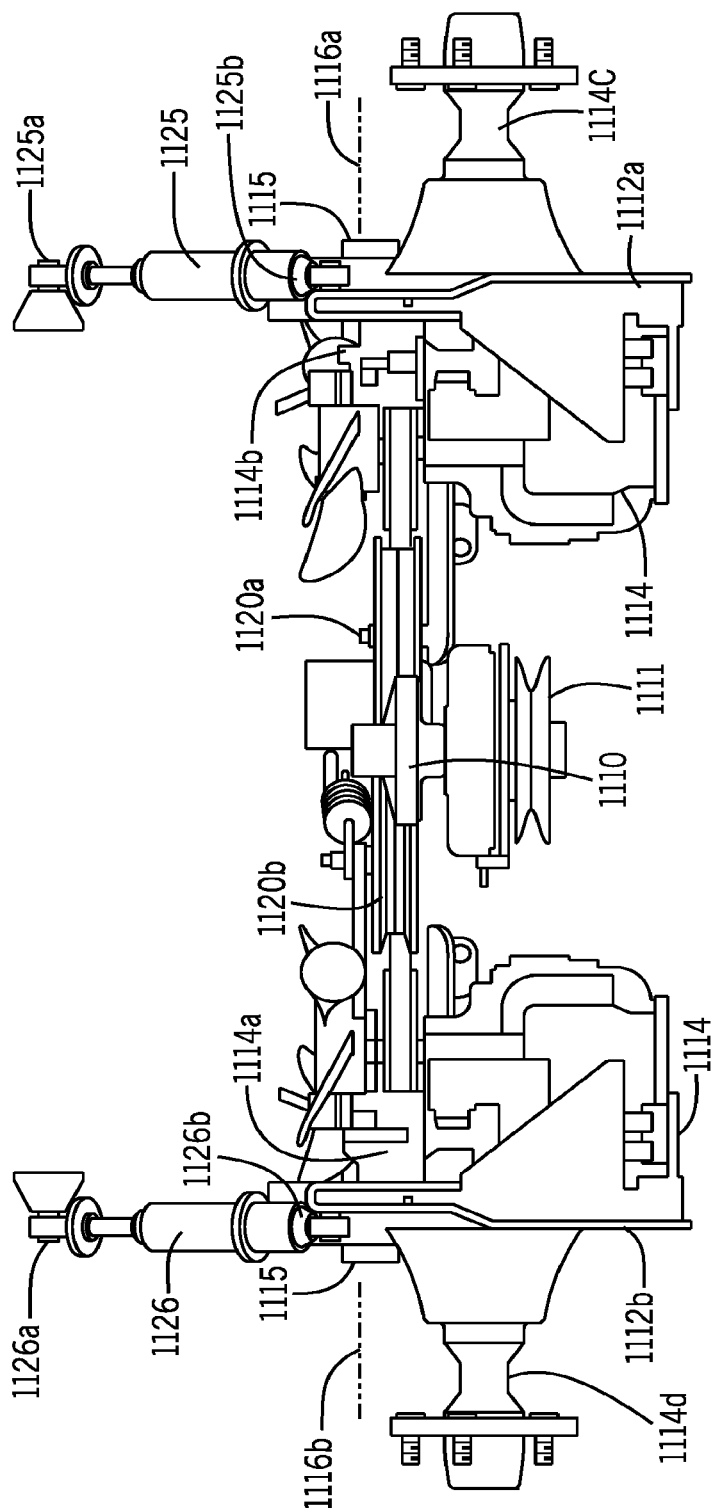
FIG. 18 illustrates an end view of a suspension system of a ZTR mower in accordance with some embodiments of the invention.
Figure 19:
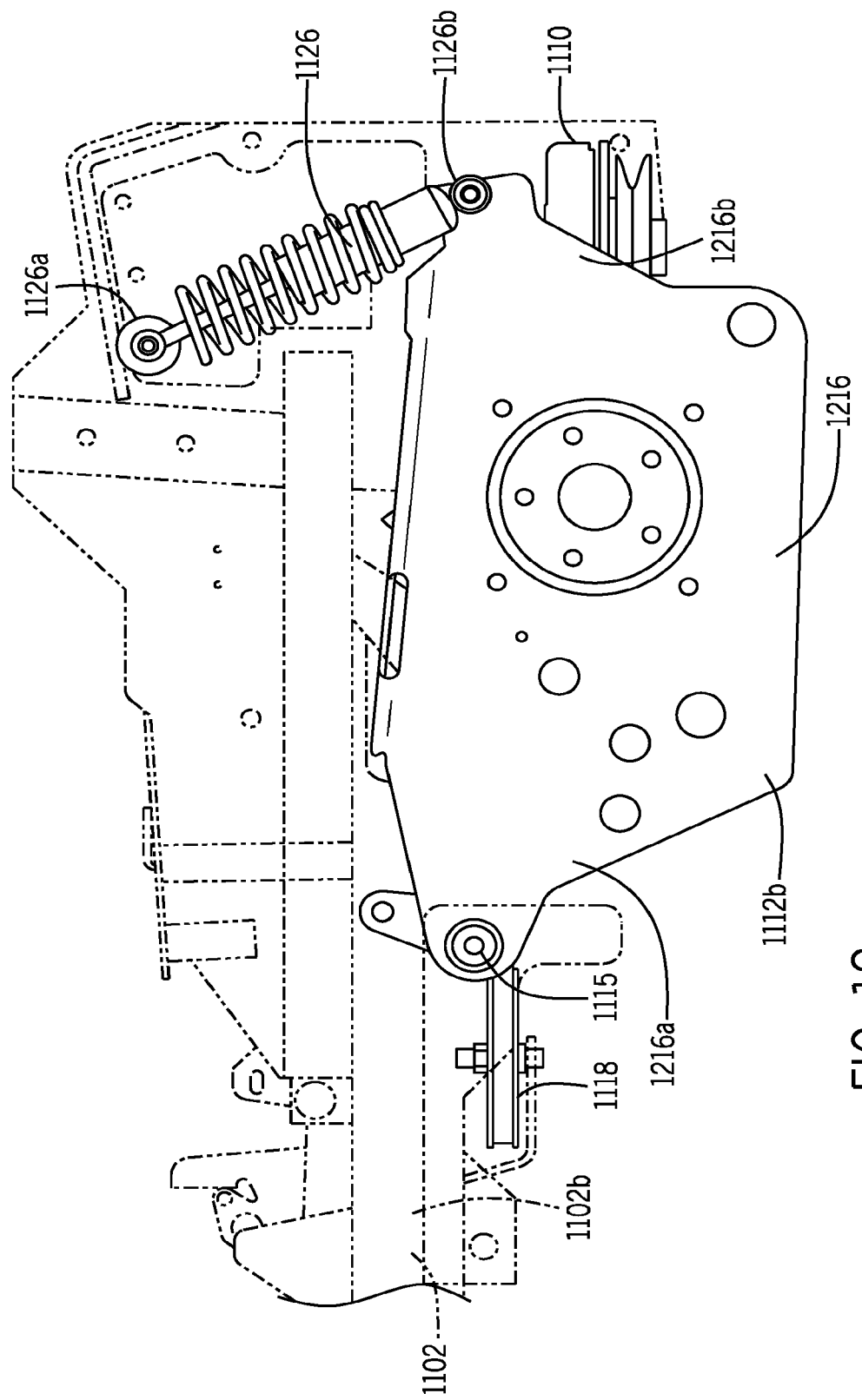
FIG. 19 illustrates a side view of a suspension system of a ZTR mower in accordance with some embodiments of the invention.
Figure 20:
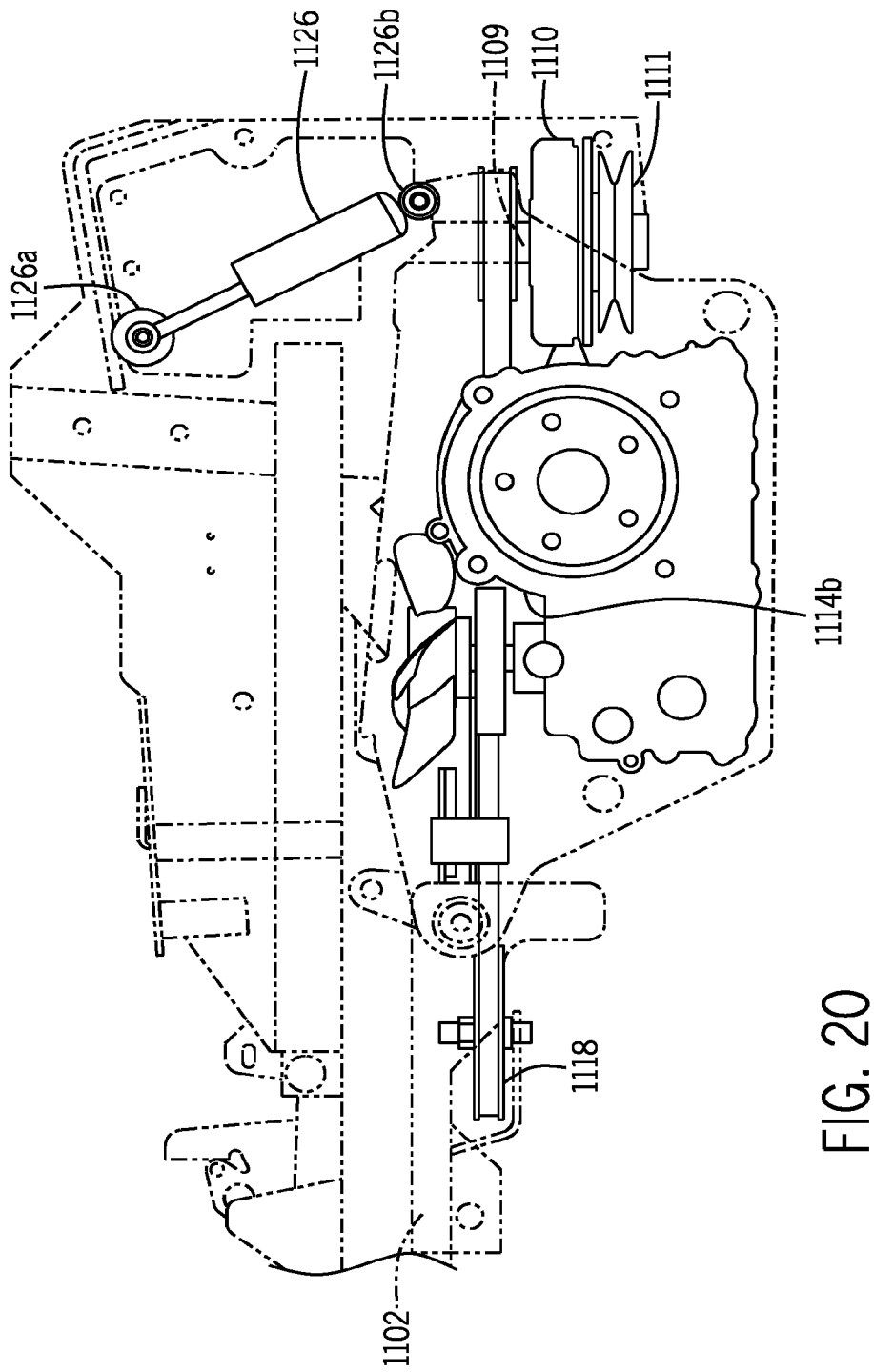
FIG. 20 illustrates a partially transparent side view of a suspension system of a ZTR mower in accordance with some embodiments of the invention.
Figure 21:
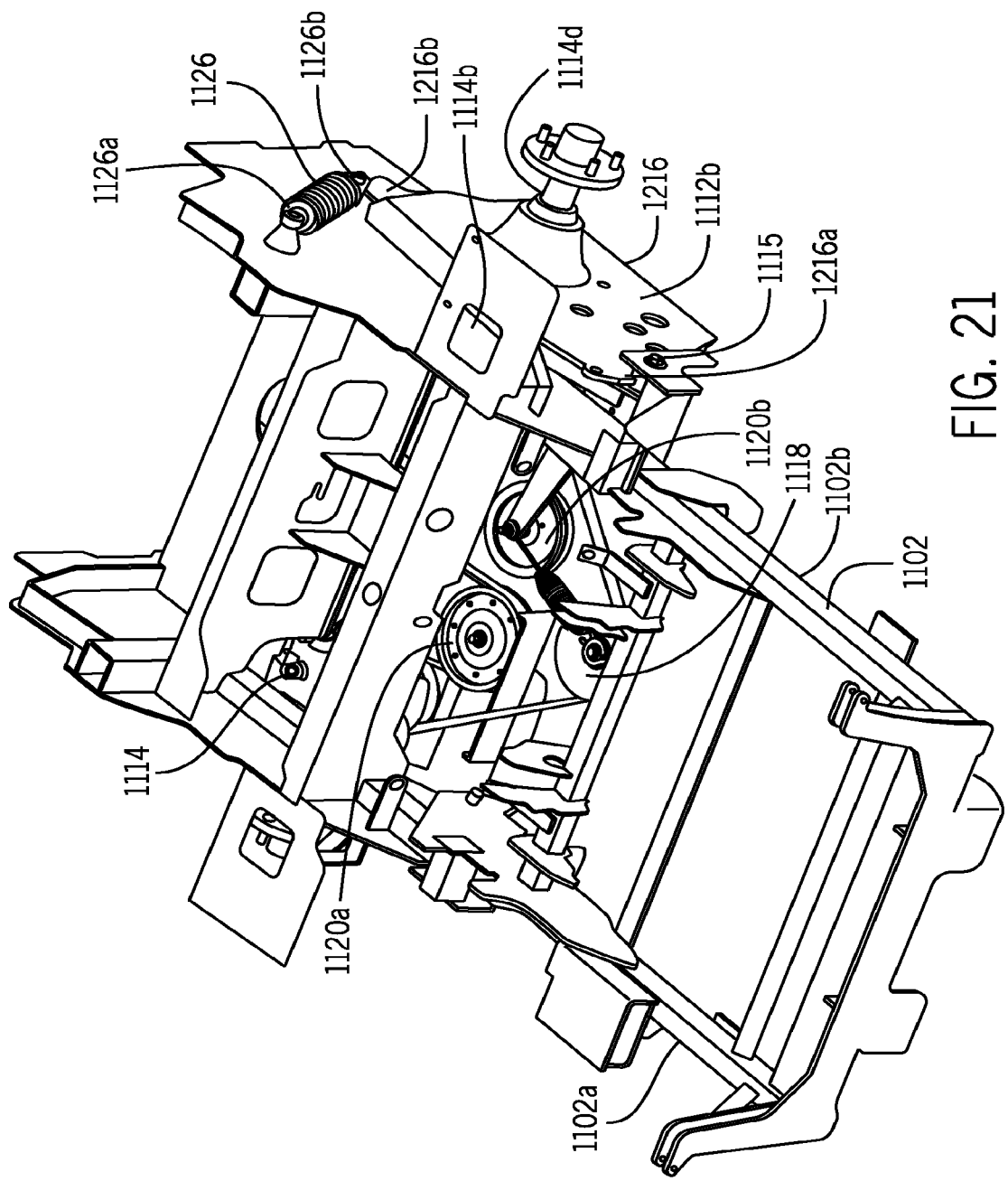
FIG. 21 illustrates a perspective view of a suspension system of a ZTR mower in accordance with some embodiments of the invention.
Figure 22:
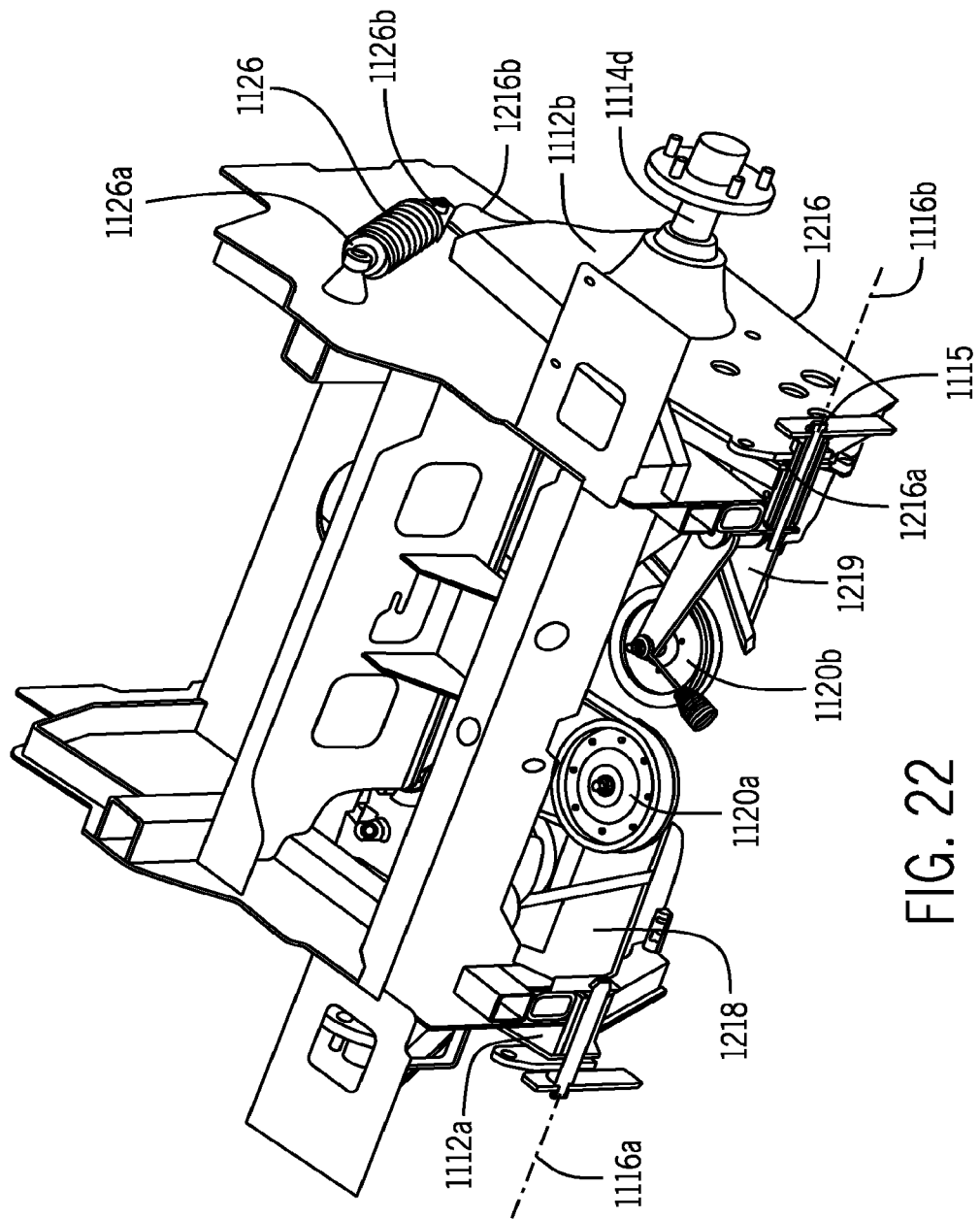
FIG. 22 illustrates a close up perspective view of a portion of a suspension system of a ZTR mower in accordance with some embodiments of the invention.

The position and coupling of the first and second subframes 1112a, 1112b to the main frame 1102 can be further illustrated in FIGS. 18-22. For example, FIG. 18 illustrates an end view of a suspension system 1103 of a ZTR mower 10 in accordance with some embodiments of the invention. FIG. 19 illustrates a side view of a suspension system 1103 of a ZTR mower 10 in accordance with some embodiments of the invention. Further, FIG. 20 illustrates a partially transparent side view of a suspension system 1103 of a ZTR mower 10 in accordance with some embodiments of the invention. FIG. 21 illustrates a perspective view of a suspension system 1103 of a ZTR mower 10, and FIG. 22 illustrates a close up perspective view of a portion of a suspension system 1103 of a ZTR mower 10 in accordance with some embodiments of the invention. Some views show the suspension system 1103 including pivot axis 1116a of the first subframe 1112a, and pivot axis 1116b of the separate second subframe 1112b. In some embodiments, the pivots 1115a, 1115b can be positioned on opposite sides of the main frame 1102 so that the pivot axis 1116a, 1116b are aligned and/or are substantially equal. In some other embodiments, the pivots 1115a, 1115b can be positioned on opposite sides of the main frame 1102 so that the pivot axis 1116a, 1116b at least partially overlap. In some further embodiments of the invention, the pivots 1115a, 1115b can be positioned on opposite sides of the main frame 1102 so that there is no overlap or alignment of the pivot axis 1116a, 1116b.

In some embodiments, either or both of the first and second subframes 1112a, 1112b can be further coupled to a motion absorbing suspension component. In some embodiments, the motion absorbing suspension component can include a compressible suspension component such as a coil spring-type suspension component alternative, e.g., rubber and/or other elastomeric polymer, one or more dampeners, hydraulics, flexures, one or more air or other gas cushions, a spring only, dampener only, etc. For example, in some embodiments, the second end 1214b of the support member 1214 can couple to a region of the main frame 1102 through a coil spring-type suspension component 1125. In some embodiments, the coil spring-type suspension component 1125 can comprise a second end 1125b coupled to the second end 1214b of the support member 1214. Further, in some embodiments, a first end 1125a of the coil spring-type suspension component 1125 can couple to a portion of the main frame 1102. In some further embodiments, the second end 1216b of the support member 1216 can couple to another portion or region of the main frame 1102 through a coil spring-type suspension component 1126. In some embodiments, the coil spring-type suspension component 1126 can comprise a second end 1126b coupled to the second end 1216b of the support member 1216, and a first end 1126a of the coil spring-type suspension component 1126 can couple to a region of the main frame 1102.

In some embodiments, either or both of the first and second subframes 1112a, 1112b can support one or more transaxle assemblies. In some embodiments, one or more of the transaxle assemblies can be driven or powered by the engine 1108 using one or more drive pulleys, including a drive pulley 1110 driven by the engine 1108 via a power take off shaft 1109. In some embodiments, the transaxle assemblies can contain both a hydraulic pump, a hydraulic valve (not shown), and a hydraulic motor (not shown) for powering the drive wheels 104 of the ZTR mower 10. For example, in some embodiments, a hydrostatic transaxle 1114a can be coupled to the first subframe 1112a. In some embodiments, a hydrostatic transaxle 1114a can be coupled to the support member 1214 between the first end 1214a and the second end 1214b. In some embodiments, a portion of the hydrostatic transaxle 1114a or a coupled component of the hydrostatic transaxle 1114a can pass through the support member 1214 to drive and/or support a driving component such as a wheel. For example, in some embodiments, a drive axle 1114c can pass through the support member 1214 to enable a drive wheel to be coupled to the drive axle 1114c. Further, in some embodiments, a hydrostatic transaxle 1114b can be coupled to the second subframe 1112b adjacent or proximate the opposite side of the main frame 1102. In some embodiments, a hydrostatic transaxle 1114b can be coupled to the support member 1216 between the first end 1216a and a second end 1216b. In some embodiments, a portion of the hydrostatic transaxle 1114b or a coupled component of the hydrostatic transaxle 1114b can pass through the support member 1216. For example, in some embodiments, a drive axle 1114d can pass through the support member 1216 to drive and/or support a driving component such as a wheel. In some further embodiments, auxiliary components attached to the ZTR mower 10 (such as the cutting blades) can be driven via one or more drive pulleys, including an auxiliary drive pulley 1111 driven by the engine 1108 via a power take off shaft 1109 (see FIG. 20).

In some embodiments, the engine 1108 can drive or power either or both of the hydrostatic transaxles 1114a, 1114b using a drive pulley 1110 driven by the engine 1108. For example, referring to FIGS. 16 and 17, in some embodiments, the drive pulley 1110 can drive either or both of the hydrostatic transaxles 1114a, 1114b with the assistance of one or more pulleys mounted to portions of the first and second subframes 1112a, 1112b. For example, some embodiments include a backside idler pulley 1120a coupled to pulley support 1218 of the first subframe 1112a. In some embodiments, the pulley support 1218 can be positioned generally perpendicular to the first subframe 1112a, extending from the support member 1214 towards the second subframe 1112b. Further, in some embodiments, the second subframe 1112b can include a pulley support 1219, to which a backside idler pulley 1120b can be mounted. In some embodiments, the pulley support 1219 can be positioned generally perpendicular to the second subframe 1112b, extending from the support member 1216 towards the first subframe 1112a. In some embodiments, the backside idler pulleys 1120a and 1120b can be attached to pulley supports 1218, 1219 with a spindle or other conventional mechanism to facilitate rotation of the backside idler pulleys 1120a, 1120b.

Some embodiments can include at least one belt idler pulley 1118 mounted to the main frame 1102. In some embodiments, the relative movement and position and/or tension of one or more of the backside idler pulleys 1120a and 1120b with respect to the belt idler pulley 1118 can be tensioned or adjusted using one or more tension springs. For example, in some embodiments, one end of a tensioner spring 1425 can be coupled to an eyebolt 1426 of the belt idler pulley 1118, with a second end of the tensioner spring 1425 coupled to the shaft 1121 of the backside idler pulley 1120b. In some embodiments, tension can be adjusted by moving the eyebolt 1426. For example, by increasing the distance between the eyebolt 1426 and the shaft 1121, the tension in the tensioner spring 1425 can be increased. Further, by decreasing the distance between the eyebolt 1426 and the shaft 1121, the tension in the tensioner spring 1425 can be decreased. Further, in some embodiments, a second end 1402 of a swing arm 1400 can be coupled to the shaft 1121 of the backside idler pulley 1120b and the second end of the tensioner spring 1425, while the first end 1404 of the swing arm 1400 can be coupled to the pulley support 1219.

In some embodiments, power can be transmitted from an engine 1108 to the drive pulley 1110 via an endless belt 1132. In some embodiments, the endless belt 1132 can be an "A" section belt, although in other embodiments, a "V" section belt, a flat belt, or other type of belt can be used. For example, in some embodiments, idler pulley(s) 1118 and backside idler pulleys 1120a, 1120b can receive an endless belt 1132 that can be driven by the engine 1108 through the drive pulley 1110. In some embodiments, the endless belt 1132 can also be received by one or more pulleys coupled to either or both of the hydrostatic transaxles 1114a,1114b. For example, in some embodiments, the endless belt 1132 can be received by driven pulley 1122a of the hydrostatic transaxle 1114a and/or driven pulley 1122b of the hydrostatic transaxle 1114b. Thus, in some embodiments of the invention, through this pulley-belt coupling, power from an internal combustion engine 1108 can be transferred to either or both hydrostatic transaxles 1114a, 1114b. When assembled within the ZTR mower 10, this configuration can enable drive wheels 104 to be independently suspended by the first and second subframes 1112a, 1112b, and independently driven by the hydrostatic transaxles 1114a, 1114b. In some other embodiments, alternative methods of driving hydrostatic transaxles 1114a, 1114b, such as through a universal drive shaft can be used.

In some embodiments, when the ZTR mower 10 is equipped with the suspension system 1103, and the mower 10 traverses a terrain, or is loaded and unloaded, the main frame 1102 can move with respect to either or both of the first and second subframes 1112a, 1112b. For example, when an operator mounts the ZTR mower 10, or if additional weight or equipment is loaded onto the ZTR mower 10, the frame 1102 can move with respect to either or both of the first and second subframes 1112a, 1112b. Furthermore, during loading of the ZTR mower 10, in some embodiments, the coil spring-type suspension components 1125, 1126, coupled to both main frame 1102 can compress, and the first and second subframes 1112a, 1112b can pivot about the pivot axis 1116a, 1116b on pivots 1115a, 1115b respectively.

In some embodiments, the backside idler pulley 1120a can pivot on the pivot 1115a around the pivot axis 1116a while coupled to a portion or region of the main frame 1102. Therefore, in some embodiments, the first subframe 1112a can allow the backside idler pulley 1120a to pivot with respect to the belt idler pulley 1118. Further, the backside idler pulley 1120b can pivot using pivot 1115b around the pivot axis 1116b while coupled to a portion or region of the main frame 1102. Therefore, in some embodiments, the second subframe 1112b can allow the backside idler pulley 1120b to pivot with respect to the belt idler pulley 1118. Further, the backside idler pulleys 1120a, 1120b can pivot with respect to each other and the belt idler pulley 1118.

Figure 23:
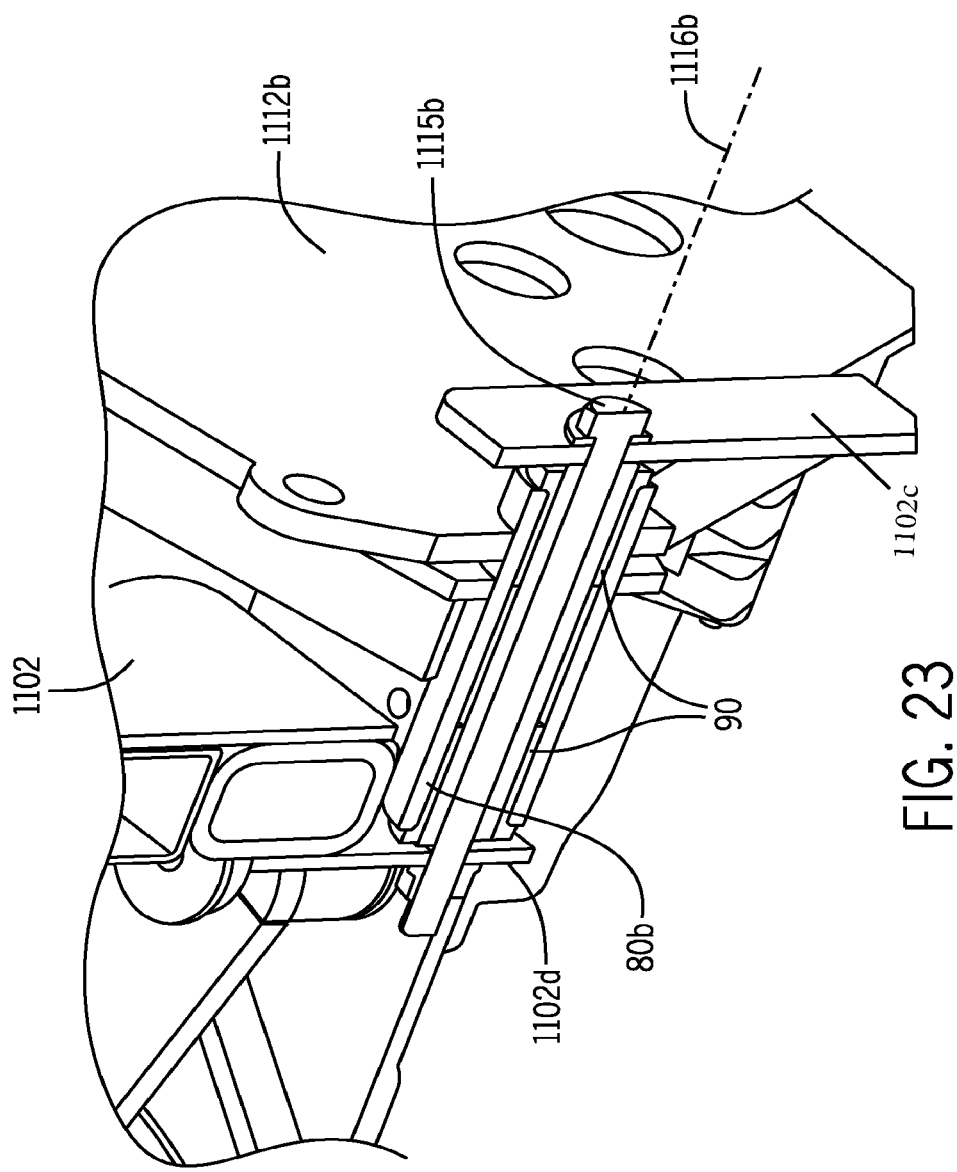
FIG. 23 illustrates a close up detailed sectional view of a suspension system of a ZTR mower in accordance with some embodiments of the invention.

Further details of the pivots 1115a, 1115b are illustrated in FIG. 23 which illustrates a close up detailed sectional view of a suspension system 1103 of a ZTR mower 10 in accordance with some embodiments of the invention. This view illustrates one side of the suspension 1103 illustrating detail of a pivot 1115b and pivot axis 1116b of the second subframe 1112b, however it is representative of the pivot 1115a and pivot axis 1116a of the second subframe 1112a. In some embodiments, the pivot 1115b can be supported by portions of the main frame 1102 as shown, and can enable the second subframe 1112b to rotate or pivot with respect to the main frame 1102. For example, the pivot 1115b can be supported by an outer section 1102c of the main frame 1102 passing through one or more bearings 90 positioned between sections of the second subframe 1112b, and supported at the other end by an inner portion 1102d of the main frame. For example, in some embodiments, the pivot 1115b can pass through pivot sleeve 80b housing the bearings 90. Thus, in some embodiments, the second subframe 1112b to rotate or pivot with respect to the main frame 1102 by rotating or pivoting on the bearings 90.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:
1. Ride-on equipment comprising:
a pair of front wheels;
a pair of rear drive wheels;
a main frame;

a subframe pivotally coupled to the main frame about a pivot axis;

a power source coupled to and supported by the main frame, the power source comprising a drive pulley; and a transaxle assembly coupled to and supported by the subframe such that the transaxle assembly is configured to pivot with respect to the power source, wherein the transaxle assembly is operably coupled to the pair of rear drive wheels and comprises at least one driven pulley, wherein the drive pulley and the at least one driven pulley are operably coupled by a belt such that the at least one driven pulley of the transaxle assembly is configured to be driven by the drive pulley of the power source via the belt.

2. The ride-on equipment of claim 1, wherein the transaxle assembly comprises a pair of hydrostatic transaxles.

3. The ride-on equipment of claim 1, wherein the drive pulley is coupled to a power take-off shaft of the power source.

4. The ride-on equipment of claim 1, wherein the subframe is located at least partially below the main frame.

5. The ride-on equipment of claim 1, further comprising a pulley and belt drive assembly, the pulley and belt drive assembly comprising at least one belt idler pulley positioned outside of the subframe and supported by the main frame, wherein the belt is an endless belt, the endless belt coupled with the at least one belt idler pulley and the at least one driven pulley.

6. The ride-on equipment of claim 1, wherein each one of the pair of rear drive wheels is operably coupled to the transaxle assembly on a respective side of the subframe.

7. The ride-on equipment of claim 6, wherein the pair of rear drive wheels comprises a first rear drive wheel and a second rear drive wheel, wherein the first rear drive wheel is operably coupled to the transaxle assembly via a first drive axle extending along a first drive axis, wherein the second rear drive wheel is operably coupled to the transaxle assembly via a second drive axle extending along a second drive axis.

8. The ride-on equipment of claim 7, wherein the pivot axis, the first drive axis, and the second drive axis are parallel to each other.

9. The ride-on equipment of claim 1, further comprising at least one motion-absorbing suspension component at least partially coupling the main frame with the subframe.

10. Ride-on equipment comprising:
a pair of front wheels;
a first rear drive wheel;
a second rear drive wheel;
a main frame;
a subframe pivotally coupled to the main frame about a pivot axis;
a power source coupled to and supported by the main frame; and
a transaxle assembly coupled to and supported by the subframe;
wherein the first rear drive wheel is operably coupled to the transaxle assembly via a first drive axle extending along a first drive axis, wherein the second rear drive wheel is operably coupled to the transaxle assembly via a second drive axle extending along a second drive axis, and wherein the pivot axis, the first drive axis, and the second drive axis are parallel to each other.

11. The ride-on equipment of claim 10, wherein the power source comprises a drive pulley, wherein the transaxle assembly comprises at least one driven pulley.

12. The ride-on equipment of claim 11, further comprising a pulley and belt drive assembly, the pulley and belt drive assembly comprising at least one belt idler pulley positioned outside of the subframe and supported by the main frame, wherein the belt is an endless belt, the endless belt coupled with the at least one belt idler pulley and the at least one driven pulley.

13. The ride-on equipment of claim 11, wherein the drive pulley is coupled to a power take-off shaft of the power source.

14. The ride-on equipment of claim 10, wherein the transaxle assembly comprises a pair of hydrostatic transaxles.

15. The ride-on equipment of claim 10, wherein the subframe is located at least partially below the main frame.

16. The ride-on equipment of claim 10, further comprising a mower deck, wherein the mower deck is suspended at least partially below the main frame.

17. The ride-on equipment of claim 16, wherein the mower deck is positioned between the pair of front wheels and the first and second rear drive wheels.

18. A zero-turn radius lawnmower comprising:
a first rear drive wheel;
a second rear drive wheel;
a main frame;
a power source having a drive pulley, the power source attached to the main frame;
a mower deck coupled to the main frame;
a subframe pivotally coupled to the main frame about a pivot axis;
a first transaxle having a first driven pulley, the first transaxle coupled to the first rear drive wheel along a first drive axis;
a second transaxle having a second driven pulley, the second transaxle coupled to the second rear drive wheel along a second drive axis; and
a belt coupled to the drive pulley, the first driven pulley, and the second driven pulley such that the power source drives the first transaxle and the second transaxle via the belt;
wherein the first transaxle and the second transaxle are attached to the subframe such that the first transaxle and the second transaxle pivot with the subframe relative to the main frame; and
wherein the pivot axis, the first drive axis, and the second drive axis are parallel to each other.

19. The zero-turn radius lawnmower of claim 18, wherein the power source is an engine.

20. The zero-turn radius lawnmower of claim 18, further comprising:
a plurality of idler pulleys attached to the subframe such that the plurality of idler pulleys, the first driven pulley, and the second driven pulley are located in a common plane and pivot with the subframe relative to the main frame.

* * * * *